United States Patent
Pitigoi-Aron et al.

(10) Patent No.: US 10,452,603 B2
(45) Date of Patent: *Oct. 22, 2019

(54) SENSORS GLOBAL BUS

(71) Applicant: QUALCOMM Incorporated, San Diego, CA (US)

(72) Inventors: Radu Pitigoi-Aron, San Jose, CA (US); Richard Dominic Wietfeldt, San Diego, CA (US); Douglas Wayne Hoffman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,856

(22) Filed: Feb. 13, 2018

(65) Prior Publication Data

US 2018/0173672 A1  Jun. 21, 2018

Related U.S. Application Data

(63) Continuation of application No. 15/676,741, filed on Aug. 14, 2017, now Pat. No. 9,921,998, which is a (Continued)

(51) Int. Cl.
*G06F 13/42* (2006.01)
(52) U.S. Cl.
CPC ...... *G06F 13/4295* (2013.01); *G06F 13/4291* (2013.01); *G06F 2213/0016* (2013.01); *Y02D 10/14* (2018.01); *Y02D 10/151* (2018.01)
(58) Field of Classification Search
CPC ............. G06F 13/4295; G06F 13/4291; G06F 2213/0016; Y02D 10/14; Y02D 10/151
See application file for complete search history.

(56) References Cited

U.S. PATENT DOCUMENTS 4,785,396 A * 11/1988 Murphy ................ H04L 12/413
370/447
5,551,068 A  8/1996 Goldsmith et al.
(Continued)

FOREIGN PATENT DOCUMENTS

CN  1193393 A  9/1998
CN  1305265 A  7/2001
(Continued)

OTHER PUBLICATIONS

International Search Report and Written Opinion—PCT/US2015/027479—ISA/EPO—dated Oct. 12, 2015.
(Continued)

*Primary Examiner* — Idriss N Alrobaye
*Assistant Examiner* — Ronald T Modo
(74) *Attorney, Agent, or Firm* — Loza & Loza LLP

(57) ABSTRACT

Systems, methods and apparatus are described that offer improved performance of a sensor bus. A first command is transmitted to devices coupled to a serial bus operated in a first mode in accordance with a first protocol to cause the serial bus to be operated in a second mode. After communicating in accordance with a second protocol while the serial bus is operated in the second mode, a second command is transmitted to the plurality of devices in accordance with the first protocol to terminate the second mode. In the second mode, extra symbols inserted into a sequence of symbols transmitted on the serial bus prevent the occurrence of an unintended signaling state on the serial bus. Pulses transmitted on a wire of the serial bus in the second mode may have their duration limited such that a filter of a second device suppresses the limited-duration pulses.

29 Claims, 18 Drawing Sheets

Related U.S. Application Data continuation of application No. 14/694,618, filed on Apr. 23, 2015, now Pat. No. 9,734,121.

(60) Provisional application No. 61/985,276, filed on Apr. 28, 2014.

(56) References Cited

U.S. PATENT DOCUMENTS

| | | | |
|---|---|---|---|
| 5,931,933 A * | 8/1999 | Billheimer | G06F 13/385 710/315 |
| 6,253,268 B1 * | 6/2001 | Bjorkengren | G06F 13/385 710/105 |
| 6,629,172 B1 | 9/2003 | Andersson et al. | |
| 7,793,005 B1 | 9/2010 | Fernald et al. | |
| 8,248,134 B2 | 8/2012 | Horton et al. | |
| 8,452,897 B1 | 5/2013 | Fernald et al. | |
| 8,478,917 B2 | 7/2013 | Scott et al. | |
| 8,566,490 B2 | 10/2013 | Weidenkeller | |
| 8,898,358 B2 | 11/2014 | Decesaris et al. | |
| 9,258,244 B1 | 2/2016 | Boyd et al. | |
| 9,734,121 B2 | 8/2017 | Pitigoi-Aron et al. | |
| 2006/0020733 A1 | 1/2006 | Sarda | |
| 2006/0290381 A1 | 12/2006 | Bui et al. | |
| 2009/0292843 A1 * | 11/2009 | Haban | G06F 13/4282 710/110 |
| 2011/0154023 A1 | 6/2011 | Smith et al. | |
| 2012/0131153 A1 | 5/2012 | Schmidt et al. | |
| 2014/0122756 A1 | 5/2014 | Laskar | |
| 2014/0270801 A1 * | 9/2014 | Sleator | H04B 10/25752 398/140 |
| 2014/0337553 A1 | 11/2014 | Du et al. | |
| 2014/0368667 A1 | 12/2014 | Peterson et al. | |
| 2014/0372642 A1 | 12/2014 | Sengoku et al. | |
| 2015/0227204 A1 | 8/2015 | Gipson et al. | |
| 2016/0147684 A1 | 5/2016 | Sengoku et al. | |
| 2017/0364472 A1 | 12/2017 | Pitigoi-Aron et al. | |
| 2018/0052802 A1 | 2/2018 | Pitigoi-Aron et al. | |
| 2018/0181531 A1 | 6/2018 | Foust et al. | |
| 2018/0225253 A1 | 8/2018 | Pitigoi-Aron et al. | |

FOREIGN PATENT DOCUMENTS

| | | |
|---|---|---|
| CN | 1333964 A | 1/2002 |
| EP | 1109315 A2 | 6/2001 |
| EP | 2725499 A1 | 4/2014 |
| JP | 2002077306 A | 3/2002 |
| JP | 2002535882 A | 10/2002 |
| JP | 2013187865 A | 9/2013 |
| TW | 201346581 A | 11/2013 |
| TW | 201415237 A | 4/2014 |
| WO | WO-0002134 A2 | 1/2000 |
| WO | WO-0042740 A1 | 7/2000 |
| WO | WO-2015054433 | 4/2015 |
| WO | 2015164102 A1 | 10/2015 |
| WO | 2016145401 A1 | 9/2016 |

OTHER PUBLICATIONS

Partial International Search Report—PCT/US2015/027479—ISA/EPO—dated Jul. 20, 2015.

Zhou J., et al., "Communication Buses and Protocols for Sensor Networks," Sensors, Jul. 2002, pp. 244-257, vol. 2 (7).

European Search Report—EP18177866—Search Authority—Munich—dated Sep. 19, 2018.

Taiwan Search Report—TW104113582—TIPO—dated Aug. 31, 2018.

* cited by examiner

SENSORS GLOBAL BUS

CROSS-REFERENCE TO RELATED APPLICATIONS

This application is a continuation of U.S. patent application Ser. No. 15/676,741 filed in the U.S. Patent Office on Aug. 14, 2017, which is a continuation of U.S. patent application Ser. No. 14/694,618 filed in the U.S. Patent Office on Apr. 23, 2015, which issued as U.S. Pat. No. 9,734,121 on Aug. 15, 2017 and which claimed priority to and the benefit of Provisional Patent Application No. 61/985,276 filed in the U.S. Patent Office on Apr. 28, 2014, the entire content of these applications being incorporated herein by reference.

TECHNICAL FIELD

The present disclosure relates generally to an interface between a host processor and a peripheral device and, more particularly, to an interface connecting sensors.

BACKGROUND

Manufacturers of mobile devices, such as cellular phones, may obtain components of the mobile devices from various sources, including different manufacturers. For example, an application processor in a mobile computing device may be obtained from a first manufacturer, while sensors employed by the mobile computing device may be obtained from one or more other manufacturers. Various standards-based or proprietary interfaces have been defined for interconnecting integrated circuit (IC) devices in mobile devices and other apparatus, and these interfaces are typically directed to a specific application or type of application. For example, cellular telephones may use a communications interface that is compatible with or conforms to a Camera Serial Interface standard specified by the Mobile Industry Processor Interface Alliance (MIPI).

Conventional interfaces optimized for a specific application may not be suitable for use in other applications. For example, the MIPI standards define a camera control interface (CCI) that uses a two-wire, bi-directional, half duplex, serial interface configured as a bus connecting a master and one or more slaves. CCI is optimized to handle the data communications requirements associated with displays, which requirements are typically beyond the capabilities of the Inter-Integrated Circuit (I2C) bus, which is in widespread use for a variety of different types of device. CCI signaling and protocols may be compatible with devices that employ the I2C bus to communicate using CCI protocols. That is, the CCI protocol uses the Serial Clock (SCL) and Serial Data (SDA) lines of the I2C bus, and CCI devices and I2C devices can be deployed on the same I2C bus such that two or more CCI devices may communicate using CCI protocols, while any communication involving an I2C device uses I2C protocols.

Later versions of CCI can provide higher throughputs using modified protocols to support faster signaling rates. In one example a CCI extension (CCIe) bus may be used to provide higher data rates for devices that are compatible with CCIe bus operations. Such devices may be referred to as CCIe devices, and the CCIe devices can attain higher data rates when communicating with each other by encoding data as symbols transmitted on both the SCL line and the SDA line of a conventional CCI bus. CCIe devices and I2C devices may coexist on the same CCIe bus, such that a plurality of devices may exchange data using CCIe encoding, while data exchanges involving legacy I2C devices may be transmitted according to I2C signaling conventions.

There exists an ongoing need for providing optimized communications on serial interfaces configured as a bus connecting different types of peripherals or cooperating devices to a processor.

SUMMARY

Embodiments disclosed herein provide systems, methods and apparatus that can improve the performance of a serial bus that couples devices configured to communicate over the serial bus using different protocols and/or signaling schemes. In an aspect of the disclosure, a method, a computer-readable storage device, and an apparatus are provided.

In an aspect of the disclosure, a method of data communications includes transmitting a first command to a plurality of devices coupled to a serial bus while the serial bus is operated in a first mode of operation, where the first command is transmitted in accordance with a first protocol to cause the serial bus to be operated in a second mode of operation, communicating with a first device of the plurality of devices in accordance with a second protocol while the serial bus is operated in the second mode of operation, and transmitting a second command to the plurality of devices in accordance with the first protocol to terminate the second mode of operation. Communicating with the first device may include encoding data in a sequence of symbols where clock information is encoded in transitions between consecutive pairs of symbols in the sequence of symbols, inserting an extra symbol between two symbols in the sequence of symbols when transmission of the two symbols without the extra symbol would cause an undesired signaling condition on the serial bus, and transmission of the two symbols with the extra symbol would prevent the undesired signaling condition on the serial bus, and transmitting the sequence of symbols on the serial bus.

In an aspect of the disclosure, an apparatus for data communication includes a transceiver that couples the apparatus to a serial bus, and a processing circuit. The processing circuit may be configured to transmit a first command to a plurality of devices coupled to a serial bus while the serial bus is operated in a first mode of operation. The first command may be transmitted in accordance with a first protocol to cause the serial bus to be operated in a second mode of operation. The processing circuit may be configured to encode data in a sequence of symbols in accordance with a second protocol, where clock information is encoded in transitions between consecutive pairs of symbols in the sequence of symbols. The processing circuit may be configured to insert an extra symbol between two symbols in the sequence of symbols when transmission of the two symbols without the extra symbol would cause an undesired signaling condition on the serial bus, and transmission of the two symbols with the extra symbol would prevent the undesired signaling condition on the serial bus. The processing circuit may be configured to transmit the sequence of symbols on the serial bus in accordance with the second protocol, and transmit a second command to the plurality of devices in accordance with the first protocol to terminate the second mode of operation.

In an aspect of the disclosure, a method performed in a data communication interface includes transmitting a first command to a plurality of devices coupled to a serial bus while the serial bus is operated in a first mode of operation where the first command is transmitted in accordance with a first protocol to cause the serial bus to be operated in a second mode of operation, communicating with a first device of the plurality of devices in accordance with a second protocol while the serial bus is operated in the second mode of operation, and transmitting a second command to the plurality of devices in accordance with the first protocol to terminate the second mode of operation. Limited-duration pulses transmitted on a first wire of the serial bus in the second mode of operation may have a duration that causes a filter of a second device of the plurality of devices to suppress the limited-duration pulses.

In an aspect of the disclosure, an apparatus includes means for transmitting a first command to a plurality of devices coupled to a serial bus while the serial bus is operated in a first mode of operation, where the first command is transmitted in accordance with a first protocol to cause the serial bus to be operated in a second mode of operation, means for communicating in accordance with a second protocol with a first device of the plurality of devices while the serial bus is operated in the second mode of operation, and means for transmitting a second command to the plurality of devices in accordance with the first protocol to terminate the second mode of operation. Limited-duration pulses transmitted on a first wire of the serial bus in the second mode of operation may have a duration that causes a filter of a second device of the plurality of devices to suppress the limited-duration pulses.

DETAILED DESCRIPTION

Figure 1:
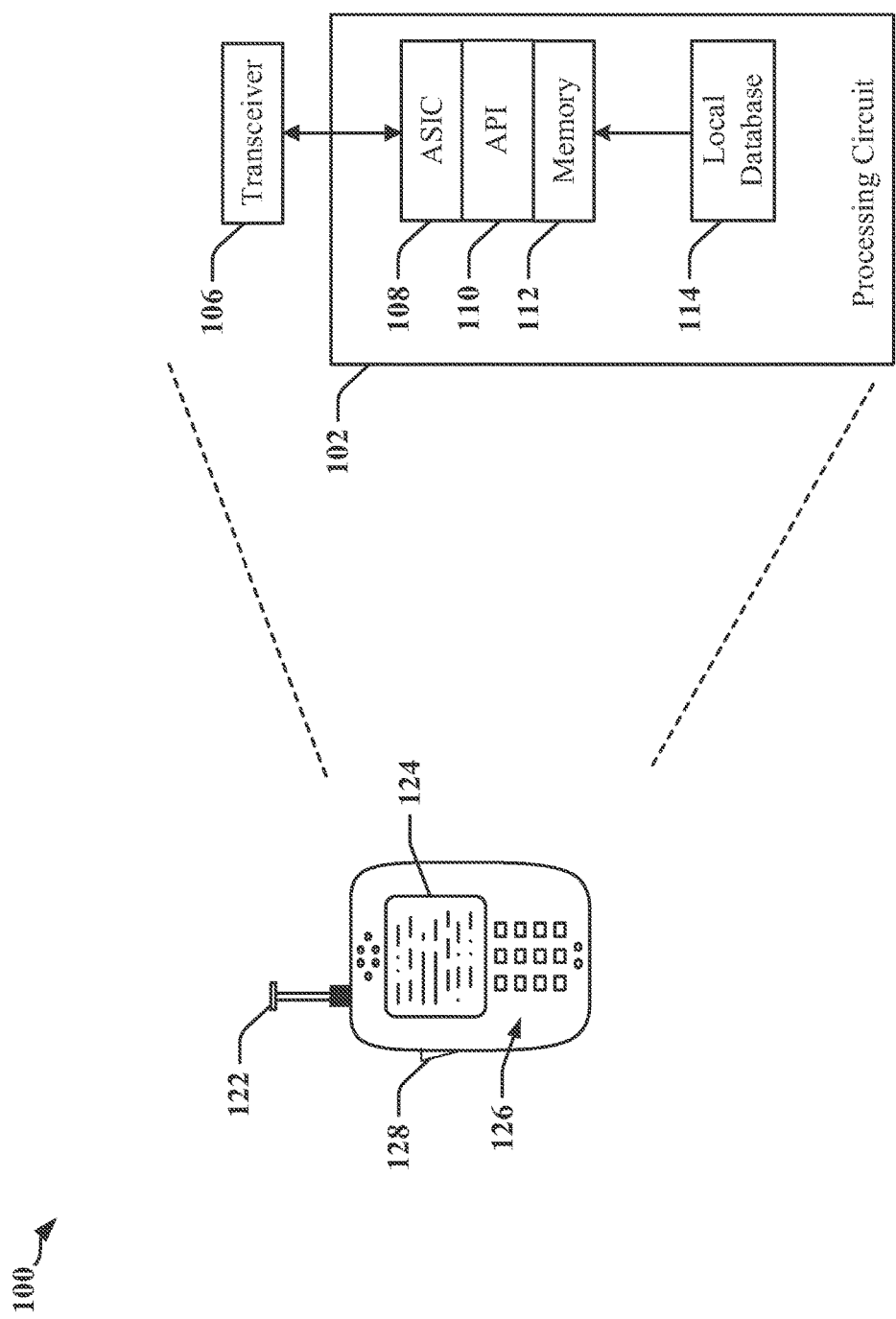
FIG. 1 depicts an apparatus employing a data link between IC devices that selectively operates according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview of the Sensors Global Bus

Certain aspects applicable to a wide range of communication interfaces are disclosed herein are described in the context of a Sensors Global bus (SGbus). The SGbus may be deployed as a two-wire bus interface used for coupling sensors and processing devices. Certain examples of the SGbus provide backwards compatibility with the well-known I2C bus, to the extent that certain legacy I2C device may communicate over the same wire pair used by the SGbus. Devices that communicate using SGbus specifications and protocols may avail of greater performance, throughput, reliability and robustness than can be provided using other interfaces, including an I2C interface.

The SGbus can reduce system power requirements, through the implementation of a low power interface, and can increase bit transfer efficiency. The SGbus employs one or more protocols that are associated with low overhead and efficient bus usage, and the SGbus can enable high-speed transactions and a corresponding low percentage of time in which the interface is active. While inactive, the SGbus typically consumes relatively low power, which may be attributable in part to a small silicon footprint. A set of sensors connected through an SGbus can be locally configured and managed, as needed or desired, to minimize complexities at the system level for example.

Examples of Devices that Employ a Serial Bus

Certain aspects disclosed herein may be applicable to communications links deployed between electronic devices that may include subcomponents of an apparatus such as a telephone, a mobile computing device, a wearable computing device, an appliance, automobile electronics, avionics systems, etc. FIG. 1 depicts an apparatus that may employ a communication link between IC devices. In one example, the apparatus 100 may include a wireless communication device that communicates through a radio frequency (RF) transceiver with a radio access network (RAN), a core access network, the Internet and/or another network. The apparatus 100 may include a communications transceiver 106 operably coupled to processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory device 112 that may maintain instructions and data that may be executed by processing circuit 102. The processing circuit 102 may be controlled by an operating system and/or through an application programming interface (API) 110 layer that supports and enables execution of software modules residing in storage media, such as the memory device 112 of the wireless device. The memory device 112 may include read-only memory (ROM) or random access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit may also be operably coupled to external devices such as antenna 122, display 124, operator controls, such as button 128 and keypad 126 among other components.

Figure 2:
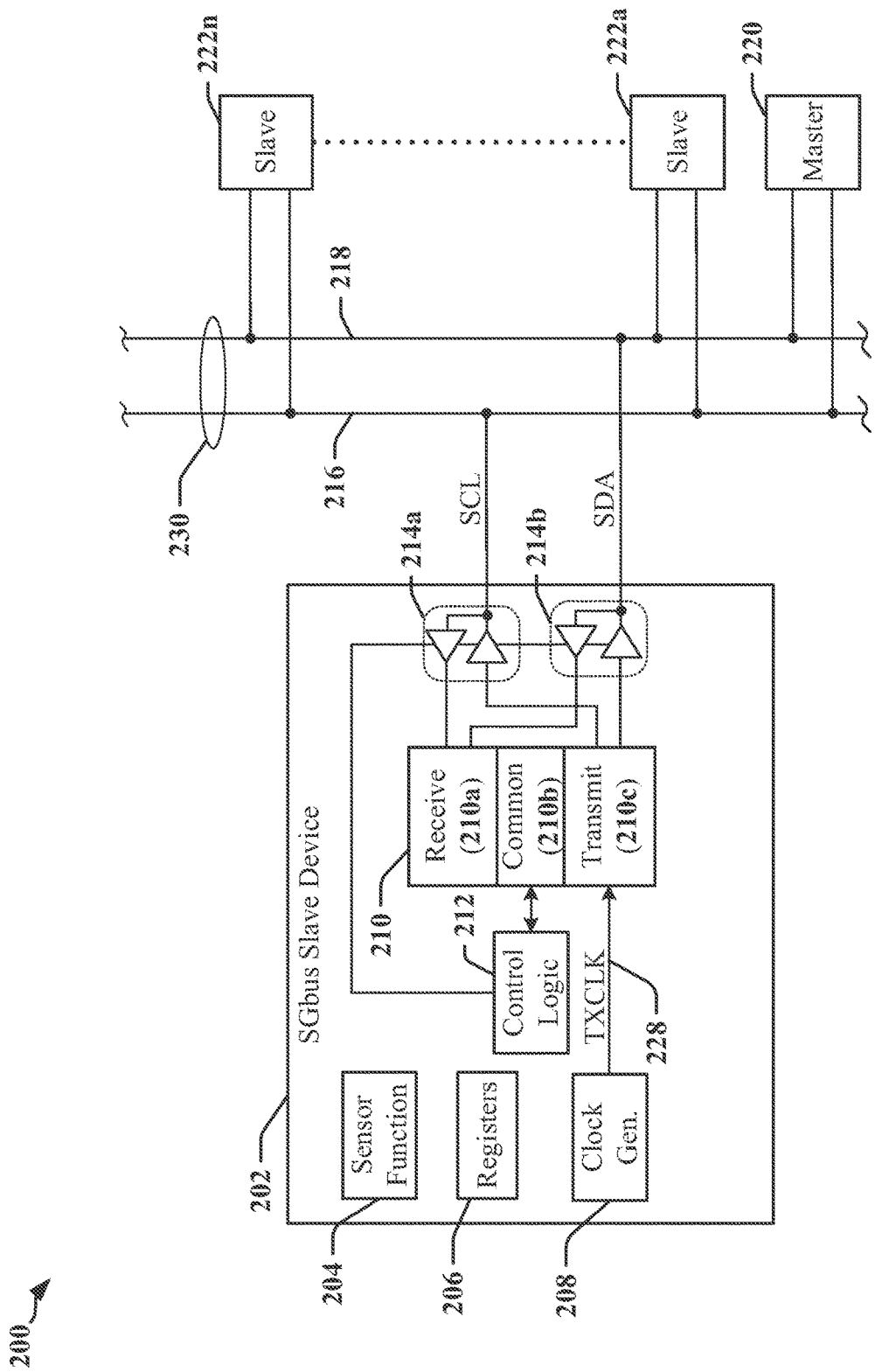
FIG. 2 illustrates a system architecture for an apparatus employing a data link between IC devices.

FIG. 2 is a block schematic illustrating certain aspects of an apparatus 200 connected to a communications bus, where the apparatus may be embodied in one or more of a wireless mobile device, a mobile telephone, a mobile computing system, a wireless telephone, a notebook computer, a tablet computing device, a media player, a gaming device, a personal digital assistants (PDA) or other handheld device, a netbook, a notebook computer, a television, an entertainment device, a wearable device, or the like. The apparatus 200 may include multiple devices 202, 220 and 222a-222n, which communicate using serial bus 230. The serial bus 230 can extend the capabilities of a conventional I2C bus for devices that are configured for enhanced features supported by the serial bus 230. For example, the serial bus 230 may support a higher bit rate than an I2C bus.

In the example illustrated in FIG. 2, a device 202 may be configured to operate as a slave on the serial bus 230. The device 202 may be adapted to provide a sensor function 204 that includes and/or manages one or more generic sensors, high speed sensors, fingerprint sensors, image sensors (e.g. cameras), touchscreen sensors, and so on. In addition, the device 202 may include configuration registers or other storage 206, control logic 212, a transceiver 210 and line drivers/receivers 214a and 214b. The control logic 212 may include a processing circuit such as a state machine, sequencer, signal processor or general-purpose processor. The transceiver 210 may include a receiver 210a, a transmitter 210c and common circuits 210b, including timing, logic and storage circuits and/or devices. In one example, the transmitter 210c encodes and transmits data based on timing provided by a clock generation circuit 208.

Figure 3:
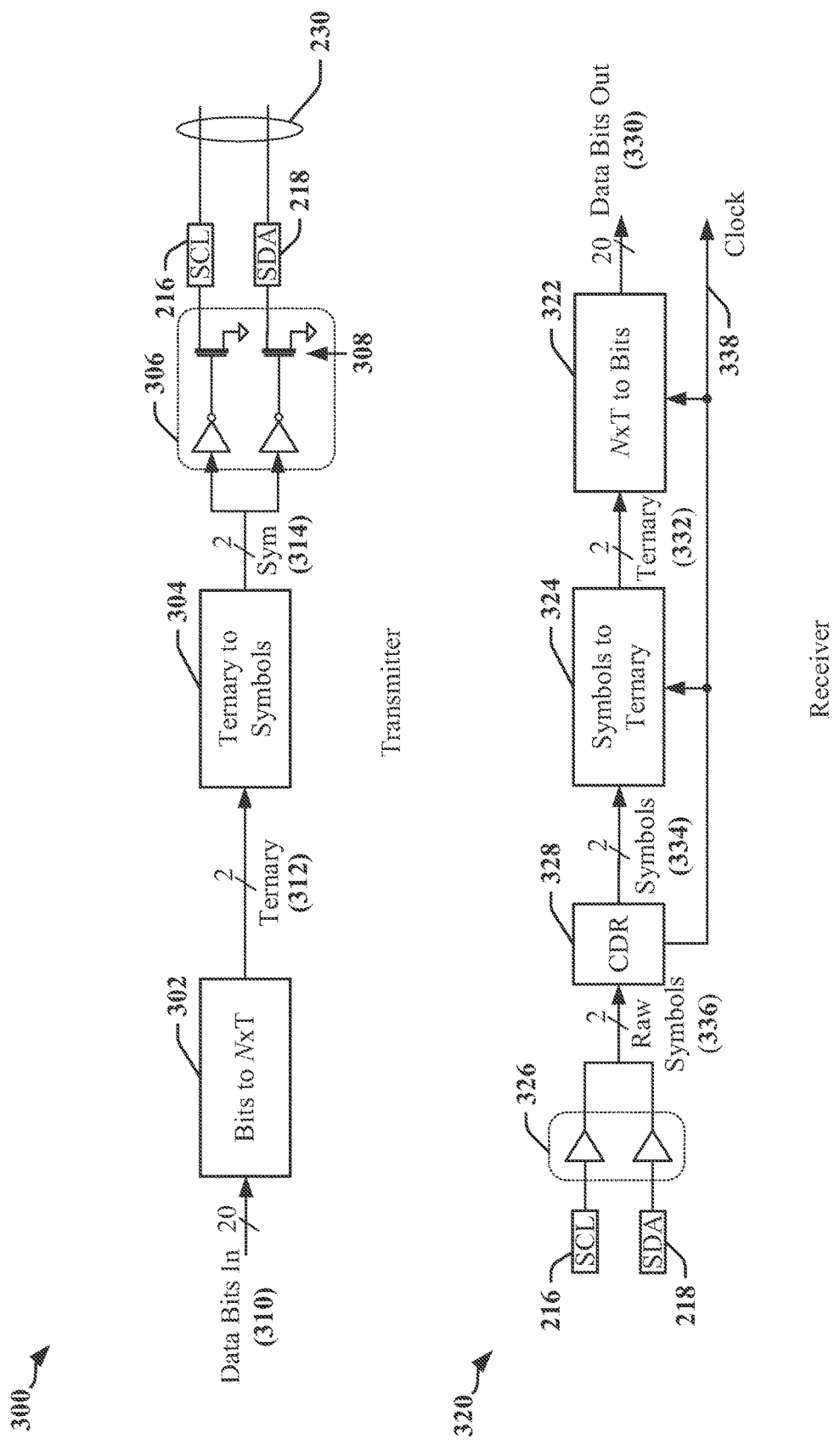
FIG. 3 illustrates a transmitter and a receiver according to certain aspects disclosed herein.

FIG. 3 is a block diagram illustrating an example of a transmitter 300 and a receiver 320 configured according to certain aspects disclosed herein. For SGbus operations, the transmitter 300 may transcode input data 310 into ternary (base-3) numbers that are encoded in symbols to be transmitted on the SCL 216 and SDA 218 signal wires. In the example depicted, each data element (also referred to as a data word) of the input data 310 may have a predefined number of bits, such as 8, 12, 16, 19 or 20 bits. A transcoder 302 may receive the input data 310 and produce a sequence of single-digit ternary numbers 312 for each data element. In some instances, the sequence of single-digit ternary numbers 312 may be expressed as a multi-digit ternary number. A single-digit ternary number may be encoded in two bits and there may be 12 digits in each sequence of single-digit ternary numbers 312. An encoder, such as the ternary-to-symbols converter 304, produces a stream of 2-bit symbols 314 that are provided to a pair of line drivers 306. In the example depicted, the line drivers 306 include open-drain output transistors 308 that drive the SCL 216 and SDA 218 signal wires. In certain examples, the line drivers 306 may include or be coupled to push-pull drivers that drive the SCL 216 and SDA 218 signal wires. The output stream of 2-bit symbols 314 generated by the ternary-to-symbols converter 304 causes a transition in the signaling state of at least one of the SCL 216 and SDA 218 signal wires between each pair of consecutive symbols 314. These transitions are provided by ensuring that no pair of consecutive symbols includes two identical symbols. The availability of a transition in signaling state in at least one wire 216 and/or 218 permits a receiver 320 to extract a receive clock 338 from the stream of data symbols 314.

In an SGbus interface, the receiver 320 may include or cooperate with a clock and data recovery (CDR) circuit 328. The receiver 320 may include line interface circuits 326 that provide a stream of raw 2-bit symbols 336 to the CDR circuit 328. The CDR circuit 328 extracts a receive clock 338 from the raw symbols 336 and provides a stream of 2-bit symbols 334 and the receive clock 338 to other circuits 324 and 322 of the receiver 320. In some examples, the CDR circuit 328 may produce multiple clocks. A decoder, such as the symbols-to-ternary converter 324, may use the receive clock 338 to decode the stream of symbols 334 into sequences of 12 ternary numbers 332. The ternary numbers 332 may be encoded using two bits. A transcoder 322 may then convert each sequence of 12 ternary numbers 332 into 8, 12, 16, 19 or 20-bit output data elements 330.

Example of a Transition Encoding Scheme with an Embedded Clock

Figure 4:
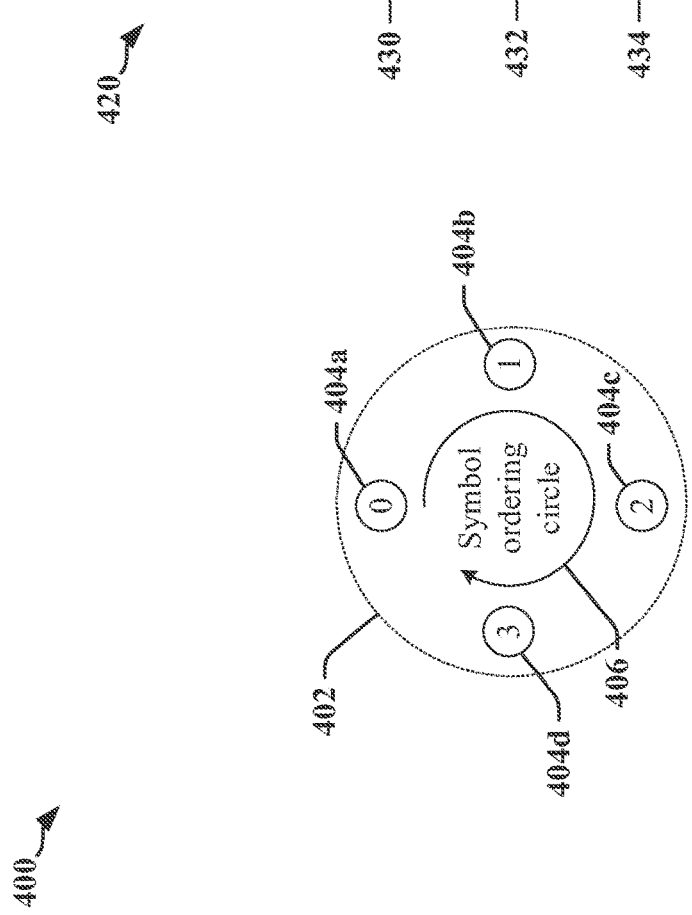
FIG. 4 illustrates a first example of an encoding scheme according to certain aspects disclosed herein.

FIG. 4 is a drawing illustrating an encoding scheme 400 that may be used by the ternary-to-symbols converter 304 to produce a sequence of symbols 314 with an embedded clock for transmission on the serial bus 230. The encoding scheme 400 may also be used by the symbols-to-ternary converter 324 of the receiver 320 to extract ternary transition numbers from symbols received from the serial bus 230. In the SGbus encoding scheme 400, the two wires of the serial bus 230 permit definition of 4 basic symbols S: {0, 1, 2, 3}. Any two consecutive symbols in the sequence of symbols 314, 334 produce different signaling states on the serial bus 230, and the symbol sequences 0,0; 1,1; 2,2; and 3,3 are invalid combinations of consecutive symbols. Accordingly, only 3 valid symbol transitions are available at each symbol boundary, where the symbol boundary is determined by the transmit clock and represents the point at which a first symbol (previous symbol Ps) 422 terminates and a second symbol (current symbol Cs) 424 begins.

According to certain aspects disclosed herein, the three available transitions are assigned a transition number (T) 426 for each Ps symbol 422. The value of T 426 can be represented by a ternary number. In one example, the value of transition number 426 is determined by assigning a symbol-ordering circle 402 for the encoding scheme. The symbol-ordering circle 402 allocates locations 404a-404d on the circle 402 for the four possible symbols, and a direction of rotation 406 between the locations 404a-404d. In the depicted example, the direction of rotation 406 is clockwise. The transition number 426 may represent the separation between the valid current symbols 424 and the immediately preceding symbol 422. Separation may be defined as the number of steps along the direction of rotation 406 on the symbol-ordering circle 402 required to reach the current symbol Cs 424 from the previous symbol 422. The number of steps can be expressed as a single digit base-3 number. It will be appreciated that a three-step difference between symbols can be represented as a $0_{base-3}$. The table 420 in FIG. 4 summarizes an encoding scheme employing this approach.

At the transmitter 300, the table 420 may be used to lookup a current symbol 424 to be transmitted, given knowledge of the previously generated symbol 422 and an input ternary number, which is used as a transition number 426. At the receiver 320, the table 420 may be used as a lookup to determine a transition number 426 that represents the transition between the previously received symbol 422 and the currently received symbol 424. The transition number 426 may be output as a ternary number.

Coexistence on a Serial Bus

A plurality of SGbus devices may coexist on the same bus 230 with one or more legacy I2C devices. Accordingly, the SGbus interface defines signaling schemes that can be ignored, undetected, or otherwise disregarded by legacy I2C devices. For example, the SGbus devices may transmit control information in signaling that is consistent with I2C mode signaling, and may transmit the data payload encoded according to CCIe protocols to obtain faster transmission speeds. The SGbus devices may use other encoding modes for transmitting the data payload, including legacy I2C modes. Alternative encoding modes may employ transition encoding to encode data in a sequence of symbols with clock information embedded in the transitions between consecutive symbols in the sequence of symbols. That is, data may be transcoded to a ternary number, where each digit of the ternary number selects a next symbol based on the previous signaling state (i.e. previous symbol) of the bus.

Certain aspects disclosed herein relate to coexistence on a serial bus of devices that communicate using different communication protocols and/or signaling. In some examples, a device configured to communicate over a serial bus using a first protocol may ignore communications between other devices that use a second protocol when the second protocol employs signaling that does generate events recognized by the first protocol. Certain aspects will now be described using examples in which the first protocol is an I2C compliant or compatible protocol, and the second protocol is a CCIe, SGbus or other protocol.

Figure 5:
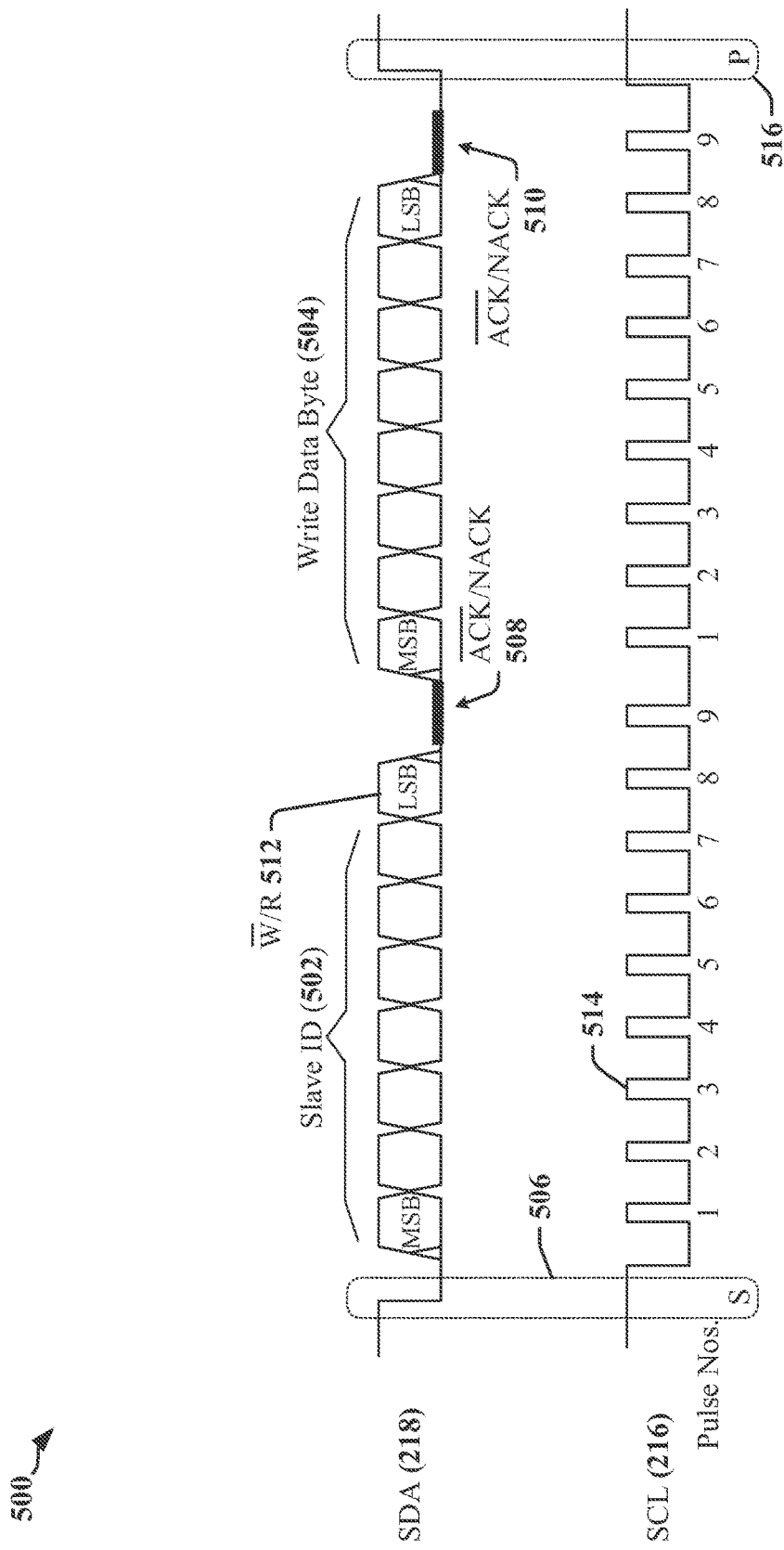
FIG. 5 illustrates a timing diagram of an I2C one byte write data operation.

FIG. 5 is a timing diagram 500 illustrating an I2C one-byte, write data operation. A transmission is initiated when a master node provides a START condition 506 by driving the SDA 218 low while the SCL 216 remains high. An I2C master node sends a 7-bit slave ID 502 on the SDA 218 to indicate which slave node on the I2C bus the master node wishes to access, followed by a Read/Write bit 512 that indicates whether the operation is a read or a write operation, whereby the Read/Write bit 512 is at logic 0 to indicate a write operation and at logic 1 to indicate a read operation. Only the slave node whose ID matches with the 7-bit slave ID 502 can respond to the write (or other) operation. In order for an I2C slave node to detect its own slave ID 502, the master node transmits at least 8-bits on the SDA 218, together with 8 clock pulses on the SCL 216. The master node provides a STOP condition 516 to terminate the transaction by driving the SDA 218 high while the SCL 216 remains high. The I2C interface is considered to be in a "Bus-Busy" state after a START condition 506 and in a "Bus-Free" state after a STOP condition 516. This behavior may be exploited to prevent legacy I2C slave nodes from reacting to transmissions according to certain protocols, including the CCIe protocol.

CCIe communications may use the combination of the SCL 216 and the SDA 218 of an I2C bus for data transmission. A CCIe symbol may be transmitted at a time corresponding to each toggle of a clock signal pulse 514 transmitted on the SCL 216 for an I2C transmission. The number of clock toggles transmitted in each frame transmission period may therefore define the number of symbols that may be transmitted for each CCIe transmission. Accordingly, 12-symbol transmissions may be provided in the 12 signaling states available during a 6-SCL pulse sequence.

The SCL 216 and/or the SDA 218 of an I2C bus may be utilized for data transmission in CCIe mode when a clock signal has been embedded within symbol transitions. Consequently, the SDA 218 and SCL 216 can be used to transmit any arbitrary 12 symbols without affecting legacy I2C slave node functionality and without using a bridge device to segregate legacy I2C slave nodes from the CCIe-capable nodes. In I2C mode, a START condition 506 may be provided only by an I2C master. In CCIe mode a START condition 506 is provided by whichever node is going to transmit a 12-symbol word.

According to certain aspects disclosed herein, I2C devices may coexist on a serial bus with devices that employ a different communication protocol, when certain signaling characteristics of the SCL 216 are exploited. For example, the I2C specification that spikes, and/or pulses with a duration of 50 ns or less be filtered by devices that are compatible or compliant with I2C Fast mode (Fm) or Fm+ devices. Accordingly, a protocol that is used on a serial bus shared with I2C devices may include a mode of operation in which pulses on the SCL 216 are limited to a duration that is less than 50 ns. The limitation on pulse duration may be enforced by controlling clock pulse generation of the high state on the SCL 216, implementing a return-to-zero signaling scheme for the SCL 216, and/or by inserting an extra symbol that prevents the SCL 216 from remaining in a high state for 50 ns. The extra symbol may be referred to herein as a dummy symbol. In one example, a number of symbols may be transmitted within a 50 ns period and, when the encoder detects that a sequence of symbols is likely to maintain the SCL 216 in a high state for 50 ns, the encoder may insert a dummy symbol that forces the SCL 216 low before the 50 ns high period is completed.

The insertion of a dummy symbol may cause an extra pulse (dummy pulse) to be transmitted on one or more signal wires of the serial bus. In the I2C example described above, a dummy symbol may be inserted to force a logic low state on the SCL 216 when two consecutive symbols would otherwise maintain the SCL 216 in the logic high state. After transmission of the dummy symbol, the SCL 216 returns to a logic high state corresponding to the second symbol in the two consecutive symbols. In some instances, return-to-zero (RZ) signaling may be used on the SCL 216 to prevent long duration positive pulses on the SCL 216. In some instances, hardware logic may be configured to police the SCL 216 by inserting a short duration logic low pulse when the SCL 216 remains in a high state for a predefined period of time.

A dummy pulse can be inserted on one or more signal wires of the serial bus for purposes other than limiting apparent clock pulse durations when transition-symbol encoding is used. A dummy pulse may be provided to avoid the occurrence of unwanted states that may indicate synchronizing events or conditions. For example, the I2C START and STOP condition may be indicated when the SCL 216 goes low while the SDA 218 remains unchanged, and a dummy pulse may be inserted on the SDA 218 to prevent such indication when the serial bus is used for communications according to a protocol other than I2C.

Transitioning Between Communication Protocols

Figure 6:
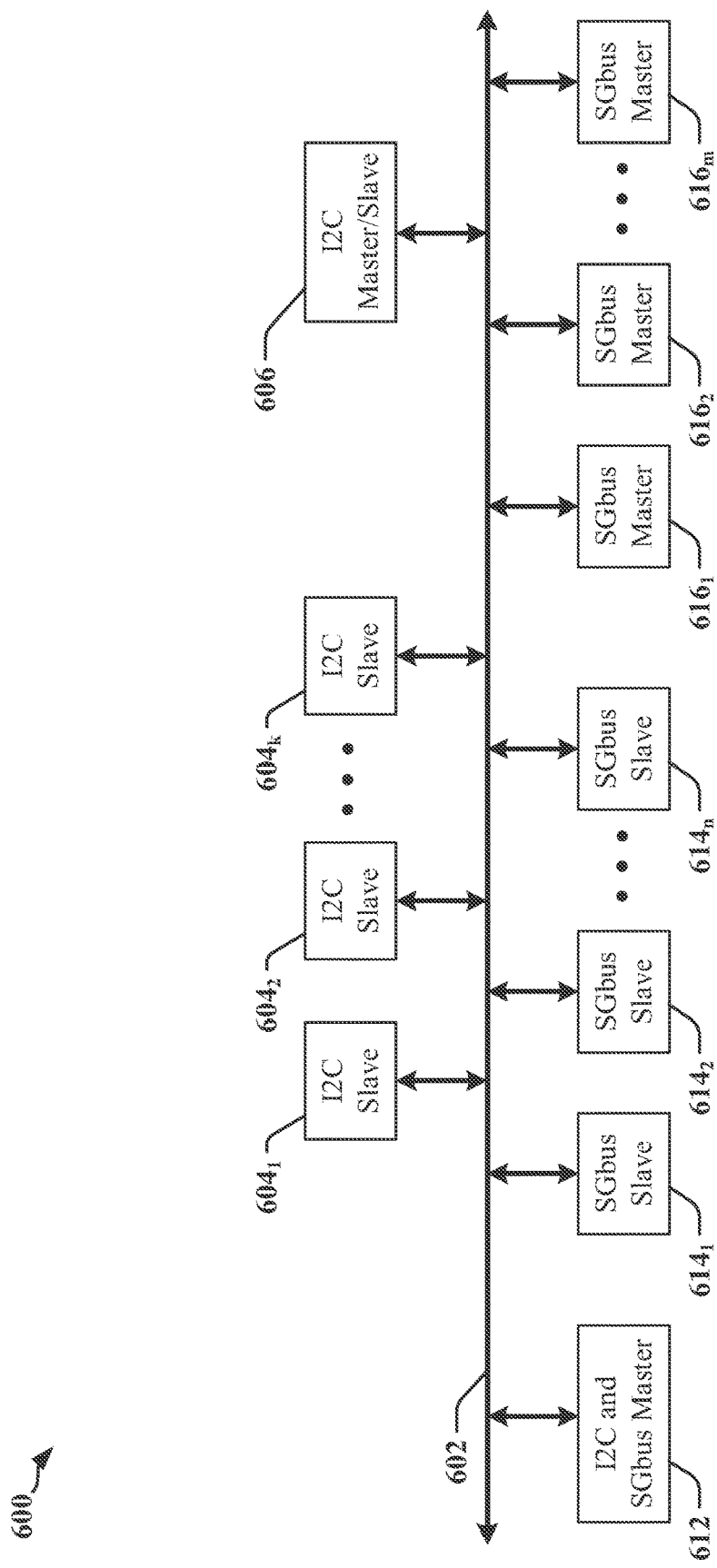
FIG. 6 illustrates a configuration of I2C devices and Sensors Global bus (SGbus) devices connected to a common serial bus.

FIG. 6 illustrates a configuration in which a shared bus 602 couples I2C devices 604₁-604ₖ, 606 and CCIe devices 612, 614₁-614ₙ and 616₁-616ₘ. The SGbus devices 612, 614₁-614ₙ and 616₁-616ₘ may coexist with conventionally configured I2C devices 604₁-604ₖ, 606, and certain of the SGbus devices 612, 614₁-614ₙ and 616₁-616ₘ may communicate using conventional I2C protocols, as desired or needed.

Data transfer on the shared bus 602, including configuration and other bus control messages, may be initiated and performed using a first protocol, such as a modified version of an I2C protocol or a variant of the I2C protocol. In one example, all transactions may be initiated using conventional I2C protocols to start the transaction.

According to certain aspects disclosed herein, communications on a shared bus 602 may be effectively containerized such that data transfers between devices coupled to the shared bus 602 are encapsulated in transactions (containers) that occur between bus management and/or control commands. Typically, devices that are configured to communicate using the protocol employed by devices engaged in a current transaction may ignore or be oblivious to the transaction.

Figure 7:
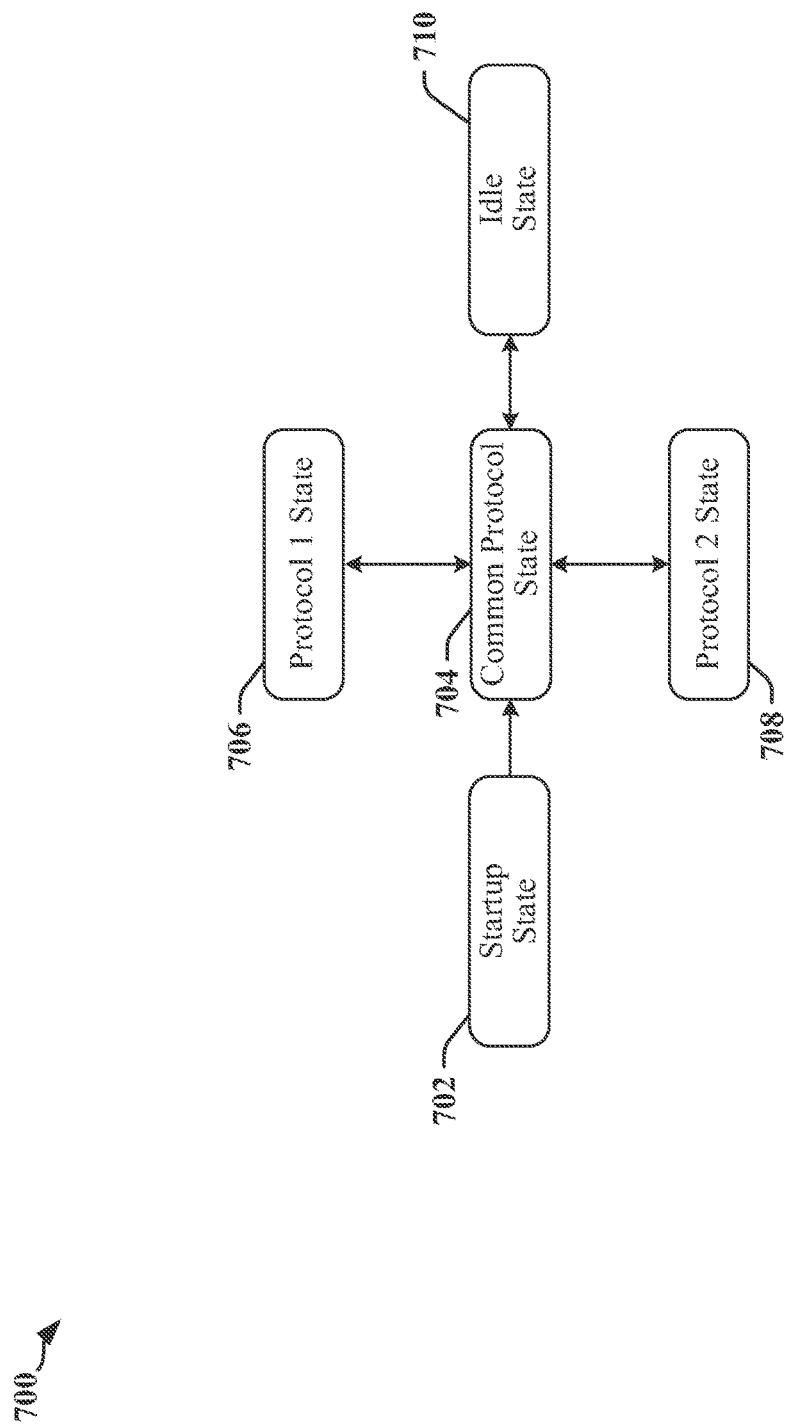
FIG. 7 illustrates a generalized scheme for transitioning between modes of operation of a serial bus and/or between multiple protocols that may be used on the serial bus in accordance with certain aspects disclosed herein.

FIG. 7 is a flow diagram 700 illustrating a generalized scheme for transitioning between containers or modes of operation of a shared bus 602. Each container, mode of operation and/or protocol may be associated with a corresponding operational state 702, 704, 706, 708, 710 of the shared bus 602. Modes of operation of the bus may distinguish between signaling schemes, data throughput, transmission formats and the like. Different modes of operation may be defined for a protocol. For example, 12-symbol and 20-symbol modes may be defined for the CCIe protocol.

In operation, a common protocol state 704 is used to exchange bus management commands using a common protocol that is understood by all bus master devices and/or by all devices on the bus. In one example, a single-protocol slave device may be unable to communicate using the common protocol and may consequently ignore bus management commands. In this latter example, a bus master device may take control of the shared bus 602 and communicate with the single-protocol slave device using the protocol understood by the single-protocol slave device.

In some examples, an I2C protocol is used in the common protocol state 704. In other examples, a different protocol may be used in the common protocol state 704. The shared bus 602 may be initialized into a startup state 702, whereby devices coupled to the shared bus 602 are configured for the common protocol. In single-bus master implementations of the common protocol, the designated bus master may discover and/or configure other devices coupled to the shared bus 602 in accordance with procedures defined by the common protocol. In multi-master implementations, one or more master devices may participate in a discovery, configuration and/or arbitration process to determine which bus master controls the shared bus 602 upon entry to the common protocol state 704. A bus hierarchical concept may be adopted, where one bus master device has active control of the shared bus 602 at any time, and other bus master devices request and wait for a grant control of the shared bus 602.

In the common protocol state 704, one or more devices may contend for control of the shared bus 602. The shared bus 602 may be operated in a desired or arbitrated protocol state 706, 708 to enable a communication transaction between devices coupled to the shared bus 602. Upon completion of the transaction, the shared bus 602 is returned to the common protocol state 704. When no device is requesting access to the shared bus 602, the shared bus 602 may enter an idle state 710. In the idle state, one or more devices may enter a power-down mode of operation. A bus-master device may cause the shared bus 602 to enter the common protocol state 704 periodically to determine if any device is requesting access to the shared bus 602. In some instances, the shared bus 602 may be returned to the common protocol state 704 in response to an interrupt or other event.

Entry into a protocol state 704, 706, 708 and exit from the protocol states 704, 706, 708 may be effected using bus management commands. These commands may be implemented using signaling, messaging, or some combination of signaling and messaging selected based on the architecture and design of the shared bus 602.

Data transfers may occur in the common protocol state 704 or one of the protocol states 706, 708 used by subsets of the devices coupled to the shared bus 602. The protocol states 706, 708 used by subsets of devices may be any protocol compatible with the shared bus 602. Data may be transferred in units of words, frames and/or packets, and flexible data transfer modes are contemplated.

In some instances, addresses may be dynamically allocated to devices coupled to the shared bus 602. In one example, dynamic address allocation is performed in the common protocol state 704 to provide unique identification of devices that communicate using the common protocol and to assign priority rankings for such devices. In some instances, dynamic address allocation is performed in one or more of the other protocol states 706, 708 to provide unique identification of devices that communicate using protocols other than the common protocol, and to assign priority rankings for such devices.

In some instances, an exception-handling scheme is defined for the common protocol state 704. For example, an I2C-compatible in-band interrupt procedure may be provided when the common protocol is I2C or a derivative of I2C.

In some instances, a "hot-plug" procedure may be implemented, where that hot-plug procedure includes and/or uses in-band interrupt and the dynamic address allocation procedures.

Figure 8:
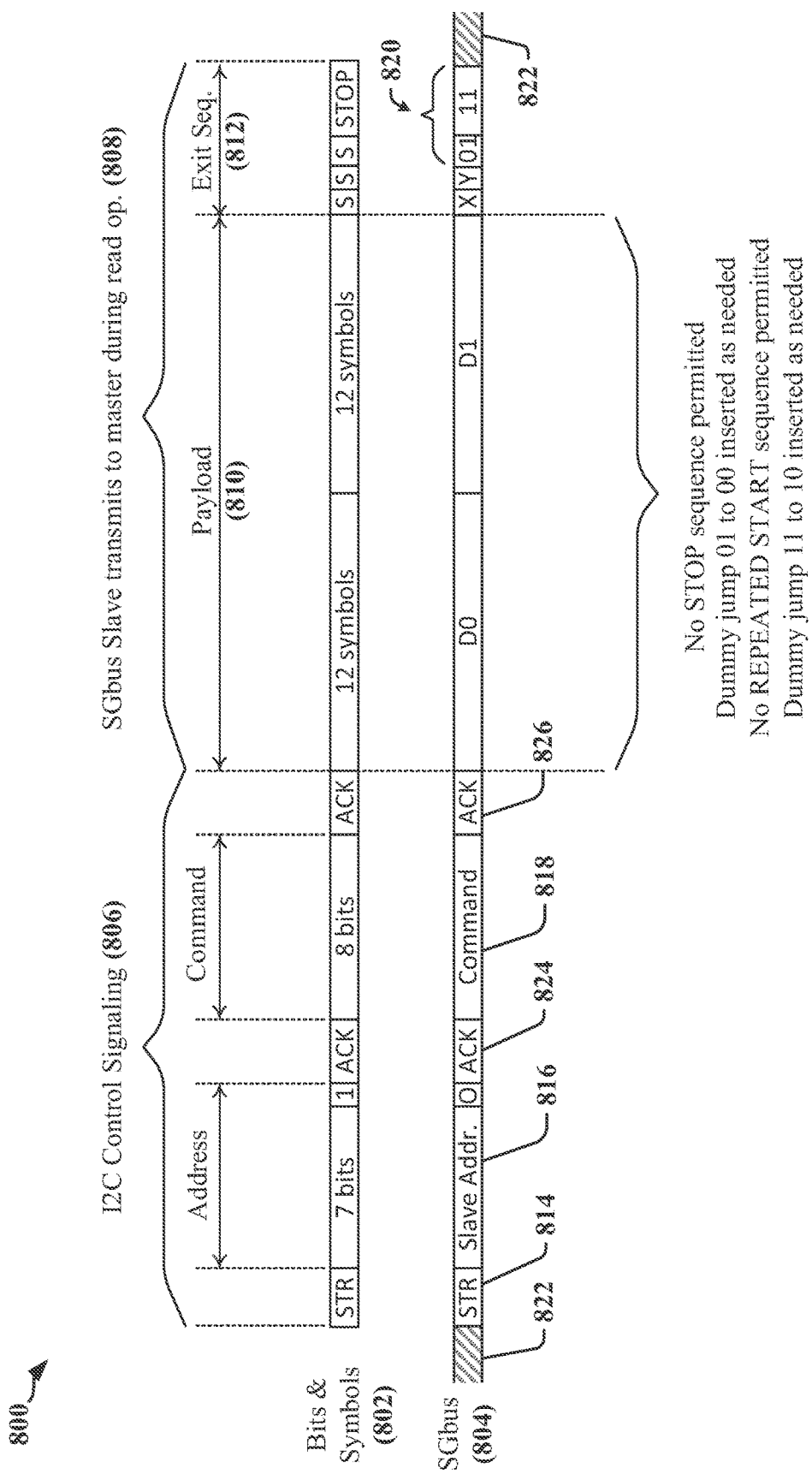
FIG. 8 illustrates the initiation and termination of transactions on the SGbus serial interface.

FIG. 8 illustrates a transaction 800 performed on the shared bus 602 for an example in which the shared bus 602 supports communication transactions involving bits and symbols 802 transmitted I2C and SGbus protocols, respectively, in accordance with certain aspects described herein. Initially, the shared bus 602 may be in a Bus-Free state 822, and control signaling 806 is handled in accordance with a commonly understood I2C protocol. After the control signaling 806 is acknowledged 824, 826, an SGbus data exchange 808 may occur, during which a data payload 810 is transmitted to the SGbus master device 612. An exit sequence 812 provides a transition from the SGbus data exchange 808 (i.e., signaling according to SGbus protocols) to signaling recognized as a STOP condition 820, 516 consistent with I2C protocols. A Bus-Free state 822 (see also the idle state 710 of FIG. 7) may then result.

In the example depicted, a transaction 800 on the shared bus 602 may be initiated by an I2C START condition 814 (see also, the START condition 506 of FIG. 5) that precedes an address 816 (see I2C slave ID 502, for example) followed by a succession of command codes 818. The command codes 818 may have a variable length that may include a number of bytes predefined by an SGbus communication protocol used for the shared bus 602.

In one example, a command code 818 may be transmitted to define a selected data transfer protocol and/or certain characteristics of the data transfer protocol. This latter command code may identify one of a plurality of available data transfer protocols to be used for subsequent data transfers. The identified data transfer protocol may control transactions until a different data transfer protocol command is inserted on the bus.

After the START condition 814 the shared bus 602 is considered busy until the next STOP condition 820 (see also, the STOP condition 516 of FIG. 5). A Bus-Free state 822 may be defined as occurring when the SCL 216 and SDA 218 are in a logic high state for a predetermined period of time. The busy/free status of the shared bus 602 may be defined or identified based on the occurrence of START conditions 814, 506 and STOP conditions 820, 516. The Bus-Free state 822 has a duration that includes the period of time after a STOP condition 820, 516, during which the SCL 216 and SDA 218 are in a logic high state, regardless of whether data is transferred using SGbus or I2C-compatible protocols. In one example, the period of time during which the SCL 216 and SDA 218 are in a logic high state may be set to be double the period of the slowest clock used on the shared bus 602. For example, in I2C fast mode, the clock signal transmitted on the SCL 216 has a frequency of at least 400 kHz, with a clock period of 2.5 µs and a 5 µs period may suffice to indicate the Bus-Free state 822.

As shown in FIG. 6, the shared bus 602 may support a legacy I2C master device 606, legacy I2C slave devices $604_1$-$604_k$, a primary SGbus master device 612, SGbus slave devices $614_1$-$614_n$ and SGbus secondary master devices $616_1$-$616_m$. The primary SGbus master device 612 is typically preconfigured with certain operational information related to the legacy I2C devices 606, $604_1$-$604_k$ resident on the shared bus 602. The primary SGbus master device 612 may include non-volatile memory in which operational and other information may be preconfigured and/or updated in response to communications received from an application host device.

Each of the secondary SGbus master device $616_1$-$616_m$ and the SGbus slave devices $614_1$-$614_n$ may be configured to internally generate a random address of any desired, configured or predefined length. In one example, the random address may have 48 bits. These devices $614_1$-$614_n$, $616_1$-$616_m$ may be capable of causing an interrupt using a reserved address that may be used to identify the existence of devices that do not have local addresses assigned.

In operation, the primary SGbus master device 612 may transmit a general call followed by a Dynamic Address Allocation command code. The primary SGbus master device 612 may then drive a clock signal on the SCL 216 of the shared bus 602 while releasing the SDA 218, which may be pulled to a logic high level. An arbitration process follows, whereby the SGbus devices $614_1$-$614_n$, $616_1$-$616_m$ drive the SDA 218 in accordance with their corresponding randomly-selected 48-bit address. The SGbus device $614_1$-$614_n$, $616_1$-$616_m$ with the lowest address wins the arbitration, in a similar fashion as specified by I2C protocol.

The primary SGbus master device 612 continues to drive a clock signal on the SCL 216 with the SDA 218 released. The winning device from among the SGbus devices $614_1$-$614_n$, $616_1$-$616_m$ may then transfer one or more characteristic byte. The characteristic byte includes information identifying certain characteristics of the winning device, including whether the device functions as a slave device only, type of device (e.g. accelerometer), data width (e.g. 16 or 12 bits wide), and other characteristics.

The primary SGbus master device 612 may transfer a 7-bit wide local address for the winning device. This address incorporates the priority level that the primary SGbus master device 612 assigns to the identified device. The primary SGbus master device 612 may repeat this procedure until it receives no response from a device seeking address arbitration. The primary SGbus master device 612 may terminate the arbitration procedure by sending a specific command code that terminates the Dynamic Address Allocation command code that enabled entry into the procedure.

A secondary SGbus master device $616_1$-$616_m$ connected to the shared bus 602 may monitor the arbitration process and capture the information exchange during the process, such that the secondary SGbus master device $616_1$-$616_m$ has a copy of the addressing, priority and configuration information for the shared bus 602. Nevertheless, the primary SGbus master device 612 may transfer information received from the SGbus slave devices 614$_1$-614$_n$ to the secondary SGbus master device 616$_1$-616$_m$.

Each of the SGbus devices 614$_1$-614$_n$, 616$_1$-616$_m$ may have one or more retaining registers that may be used for storing dynamic addresses, such that the SGbus configuration can be reserved for use after a cold power-up. If two SGbus devices 614$_1$-614$_n$ and/or 616$_1$-616$_m$ select the same random 48-bit address, and have the same characteristic byte, the two devices may store the same local address. The double assignment may remain in effect until the SGbus master device 612 requires a data transfer and the data transmitted concurrently by the two different two SGbus slave devices 614$_1$-614$_n$ is different. At least one of the two SGbus slave devices 614$_1$-614$_n$ may recognize that it has the same address as another SGbus slave device 614$_1$-614$_n$ connected to the shared bus 602 and may drop off the shared bus 602. At the next Bus-Free state 822, the dropped-off SGbus slave device 614$_1$-614$_n$ may request a new local address, using the dedicated control code for this requirement. Other procedures for identifying double assignments of the same local address may be available, including existing procedures that may be adapted according to certain aspects disclosed herein. For instance, a primary or main master device may be informed of the number of devices that need a local address, and if fewer local addresses are allocated or assigned, the main master may initiate and/or perform a recovery procedure. In one example of a recovery procedure, the dynamic address assignment procedure may be restarted from scratch. Other examples of reliable fallback procedures are available for use in recovery from instances where two or more devices have duplicate addresses.

Each of the SGbus devices 614$_1$-614$_n$ and/or 616$_1$-616$_m$ is assigned a priority ranking by the primary SGbus master device 612. The priority rank may be defined by the SGbus master device 612 using the level of the dynamically allocated local address, whereby lower address values have higher priority ranks.

Each of the SGbus devices 614$_1$-614$_n$, 616$_1$-616$_m$ can assert an in-band Interrupt Request (IRQ) at any time during the Bus-Free state. The IRQ assertion procedure corresponds to similar procedures used for bus arbitration in I2C and other I2C-related interfaces. In accordance with certain aspects disclosed herein, however, certain refinements and enhancements may be employed for IRQ procedures.

In one example, an SGbus slave device 614$_1$-614$_m$ can assert an in-band IRQ by pulling the SDA 218 to a logic low signaling state. The primary SGbus master device 612 may start driving a clock signal on the SCL 216, while leaving the SDA 218 undriven. The SDA 218 may be pulled toward the logic high signaling state. The SGbus slave device 614$_1$-614$_n$ may drive the SDA 218 in order to transmit its own address. The primary SGbus master device 612 acknowledges the IRQ, and then performs a repeated START using the address received from the SGbus slave device 614$_1$-614$_n$. A repeated START condition 928 (see FIG. 9) is provided by driving the SDA signal wire 922 low while the SCL signal wire 924 is high during a Bus-Busy state, and when a STOP condition 908 would be expected. Devices 614$_1$-614$_n$, 616$_1$-616$_m$ and/or 604$_1$-604$_k$ may monitor the bus for their respective addresses after detecting a repeated START condition 928.

The primary SGbus master device 612 may optionally configure the data transfer mode using the Data Transfer Protocol byte, if the previously define mode is different from a presently desired or required mode. The primary SGbus master device 612 and the interrupting SGbus slave device 614$_1$-614$_n$ may then commence communicating. Bus contention takes place during address evaluation, and any additional SGbus devices 614$_1$-614$_n$, 616$_1$-616$_m$ and/or any legacy I2C devices 604$_1$-604$_k$ trying to win the bus at the same time will lose the arbitration and may retry on the next Bus-Free state 822.

In another example, secondary SGbus master device 616$_1$-616$_m$ can assert an in-band IRQ using a procedure that is similar to that for SGbus slave devices 614$_1$-614$_n$. When the primary SGbus master device 612 recognizes that the IRQ is asserted by a secondary SGbus master device 616$_1$-616$_m$, the primary SGbus master device 612 releases the SCL 216 and the secondary SGbus master device 616$_1$-616$_m$ performs an immediate repeated START condition 928 in order to address a target device for communication.

In another example, a legacy I2C Master device 606 may assert an IRQ in a procedure that is similar to that described for secondary SGbus master devices 616$_1$-616$_m$. The legacy I2C Master device 606 is typically unaware when it is competing with an SGbus master device 612, since the SGbus master device 612 has an equivalent higher address (e.g., 111 1111) and would lose the arbitration. It will be appreciated that in certain applications it may be desirable to exclude slower legacy devices, such as I2C devices, from SGbus. For example, legacy devices may be precluded due to bus speed (throughput requirements) or because of the complexity of procedures needed to enable coexistence.

A primary SGbus master device 612 that starts a communication transaction evaluates the address arbitration procedure, during an address call. Any SGbus slave device 614$_1$-614$_n$, secondary SGbus master device 616$_1$-616$_m$ or legacy I2C Master device 606 that attempts to interrupt the primary SGbus master device 612 is typically successful. However, any device that has a lower priority rank may have to wait for the next Bus-Free state 822.

In some instances, there may be a competition between a legacy I2C master device 606 and an SGbus slave device 614$_1$-614$_n$. The primary SGbus master device 612 starts the clock signal on the SCL 216 when it sees a START condition (i.e., when SDA 218 goes low). Accordingly, an SGbus slave device 614$_1$-614$_n$ that has a higher priority rank presumptively wins the arbitration process. The primary SGbus master device 612 is aware of the outcome of the arbitration process, including the winning address.

According to certain aspects disclosed herein, an SGbus may be a multi-mastered bus in which one or more SGbus master devices 612, 616$_1$-616$_m$ and a legacy I2C master device 606 provide bus control and management functions for corresponding slave devices. Certain multi-master arbitration and bus control procedures employed in an SGbus may follow a global rule such as is as described for IRQ procedures. Accordingly, I2C rules may apply when a legacy I2C master device 606 competes with one or more SGbus secondary master devices 616$_1$-616$_m$.

When an SGbus secondary master device 616$_1$-616$_m$ acquires control of the shared bus 602 to perform a transaction, the SGbus secondary master device 616$_1$-616$_m$ maintains control of the shared bus 602 only for as long as is required to perform the transaction. After the respective transaction, a STOP condition 820 causes the bus control to revert back to the primary SGbus master device 612.

A legacy I2C Master 606 generally transfers data to legacy I2C slave devices 604$_1$-604$_k$, and employs I2C-compliant protocols, even when other data transfer protocols such as the CCIe data transfer protocol are available. Communications between a legacy I2C Master 606 and SGbus devices $614_1$-$614_n$, $616_1$-$616_m$ may be managed at the system level. In one example, the primary SGbus master device 612 may inform the legacy I2C Master 606 of the presence of the SGbus slave devices $614_1$-$614_n$. The primary SGbus master device 612 may provide information regarding local addresses and characteristics of the SGbus slave devices $614_1$-$614_n$. Any resultant communication between the legacy I2C Master 606 and the SGbus slave devices $614_1$-$614_n$ may be consistent with I2C protocols.

According to certain aspects disclosed herein, an SGbus may support a hot-plug capability in which an SGbus device 612, $614_1$-$614_n$, or $616_1$-$616_m$ may be inserted into a bus 602 that has already been dynamically configured and is operational. A hot-plugged SGbus device 612, $614_1$-$614_n$, or $616_1$-$616_m$ powers up on the bus and assumes a condition similar to a cold power-up, and the hot-plugged SGbus device 612, $614_1$-$614_n$, or $616_1$-$616_m$ does not initially have an assigned local address. A device 612, $614_1$-$614_n$, or $616_1$-$616_m$ that does not have an assigned local address may perform an IRQ using a predefined byte as an indicator that it needs a local address. Upon detecting the IRQ and the presence on the shared bus 602 of the hot-plugged SGbus device 612, $614_1$-$614_n$, or $616_1$-$616_m$ the primary SGbus master device 612 may perform a dynamic address allocation procedure, such as is described herein.

According to certain aspects disclosed herein, an SGbus may support a plurality of data transfer protocols, including I2C protocols, CCI protocols and variants thereof, and other protocols. In one example a CCI extension (CCIe) bus may be used to provide a data transport on the SGbus. CCIe communications and I2C communications may be performed on the shared bus 602, such that in a first time interval, data may be transmitted using CCIe encoding and other data may be transmitted in a different time interval according to I2C signaling conventions. The SGbus employs physical layer protocols that ensure that CCIe transmissions do not violate I2C protocols.

Figure 9:
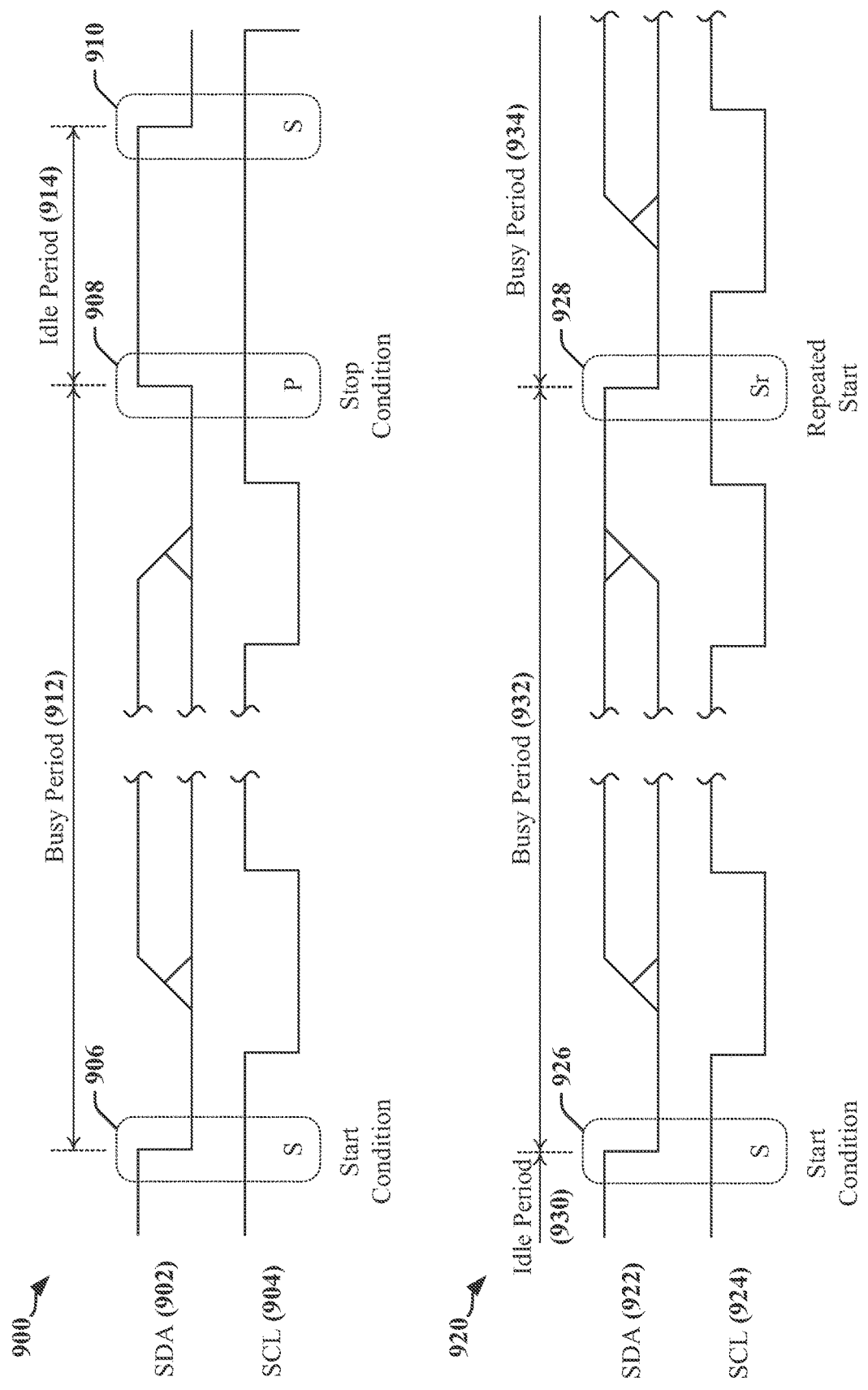
FIG. 9 is a diagram that illustrates timing associated with multiple frames transmitted according to I2C protocols.

FIG. 9 includes timing diagrams 900 and 920 that illustrate timing associated with multiple data transmissions on an I2C bus. In a first basic example, the period of time (the idle period 914) that elapses between a STOP condition 908 and a consecutive START condition 910 may be prolonged, causing the conventional I2C bus to be idle during this idle period 914. In operation, a busy period 912 commences when the I2C bus master transmits a first START condition 906, followed by data. The busy period 912 ends when the I2C bus master transmits a STOP condition 908 and an idle period 914 ensues. The idle period 914 ends with transmission of a second START condition 910.

With reference also to the timing diagram 920, in some instances, the idle periods 914 between successive data transmissions on the I2C bus may be reduced in number or eliminated by transmitting a repeated START condition (Sr) 928 rather than a STOP condition 908. The repeated START condition 928 terminates the preceding data transmission and simultaneously indicates the commencement of a next data transmission. The state transition on the SDA signal wire 922 is identical for a START condition 926 occurring after an idle period 930 and the repeated START condition 928. Specifically, the SDA signal wire 922 transitions from high to low while the SCL signal wire 924 is high. When a repeated START condition 928 is used between data transmissions, a first busy period 932 is immediately followed by a second busy period 934.

In an SGbus, the data transfer segment can use any I2C, CCIe or another transition encoding protocol, or variants thereof. The type of data transfer protocol to be used may be indicated by the SGbus master device 612, or $616_1$-$616_m$, at the start of communication with an SGbus slave device $614_1$-$614_n$. The selection of a data transfer protocol for each SGbus slave device $614_1$-$614_n$ remains in effect until changed by the SGbus master device 612, or $616_1$-$616_m$. In some instances, the primary SGbus master device 612 may configure any devices that can communicate in both I2C and CCIe modes to use the I2C mode as a default mode.

An exit from data transfer may be effected by inserting a STOP condition 820, 908 on the shared bus 602, in which case the shared bus 602 may enter a Bus-Free state 822. Certain sequences of symbols transmitted in a transaction on the shared bus 602 may produce signaling states that may be identified as a STOP condition 820, 908 or repeated START condition 928 by detection logic of one or more devices $604_1$-$604_n$, $614_1$-$614_n$, $616_1$-$616_m$ that are not participants in the transaction.

Figure 10:
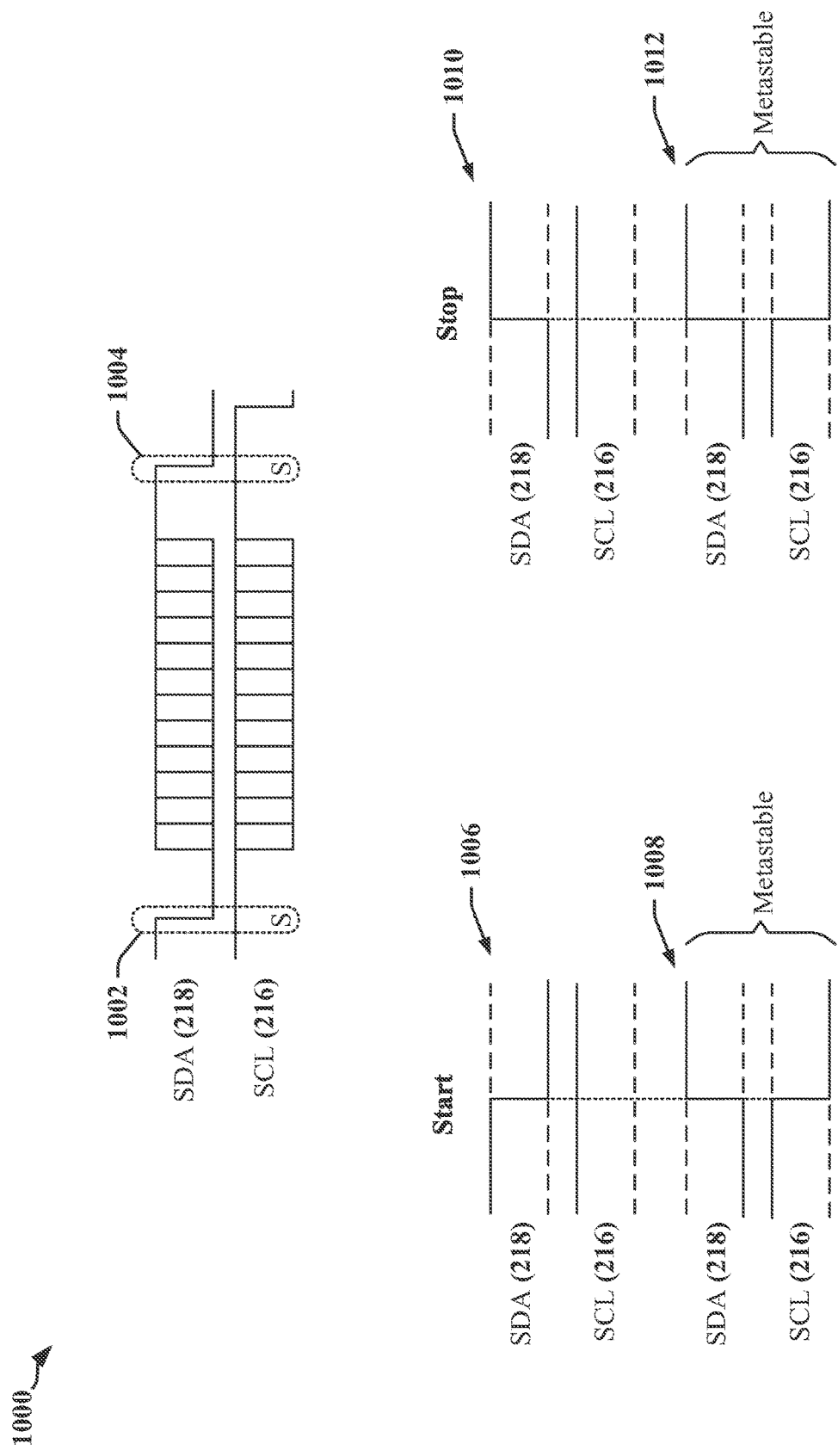
FIG. 10 illustrates the occurrence of unintended START and STOP conditions.

FIG. 10 illustrates the occurrence of unintended START conditions 1008 and unintended STOP conditions 1012, which may arise during normal data exchange and/or because of the illustrated metastability issues in synchronous logic. The unintended STOP conditions 1012 and unintended START conditions 1008 may be avoided by configuring the encoder to identify sequences of symbols that may cause the unintended STOP conditions 1012 and unintended START conditions 1008. The encoder may modify the stream of transmitted symbols to avoid generating the unintended and unwanted STOP conditions 1012 and/or unintended START conditions 1008. In one example, the coding protocol may provide a binary "00" dummy symbol insertion after any binary "01" symbol in order to avoid unintended STOP conditions 1012 while in data transfer mode. In another example, the coding protocol may provide a binary "10" dummy symbol insertion after any occurrence of a binary "11" symbol to avoid unintended START conditions 1008, which may cause a legacy I2C device to check for its address after a false or unintended START condition 1008. It will be appreciated that the legacy I2C device may respond to a false or unintended START condition 1008 if it finds an address match and thereby adversely affect CCIe active drivers.

In CCIe mode data transfers, frame synchronization may be performed based on a count of the symbols transmitted on the shared bus 602, commencing with the first symbol sent after the entry point into data transfer mode. For SGbus operations, there is no need for a repeated START condition 928 to be sent ahead of each sequence of 12 symbols or sequence of 20 symbols in the frame. The absence of the repeated START condition 928 may increase data throughput.

In some instances, frame synchronization can be further verified by checking the last three least significant bits (LSBs), "000," which are used for error detection. A single error can be detected by checking the last three LSBs of the binary decoded number. The single error may relate to a symbol error on any 12-symbol word, where no two consecutive symbols are identical. Symbols may be encoded as binary numbers [SDA:SCL], where the bit corresponding to signaling state of the SDA 218 is in the most significant bit (MSB) position. One symbol error may be the result of an error in the sampled signaling state of one or both the SDA 218 or the SCL 216.

Figure 11:
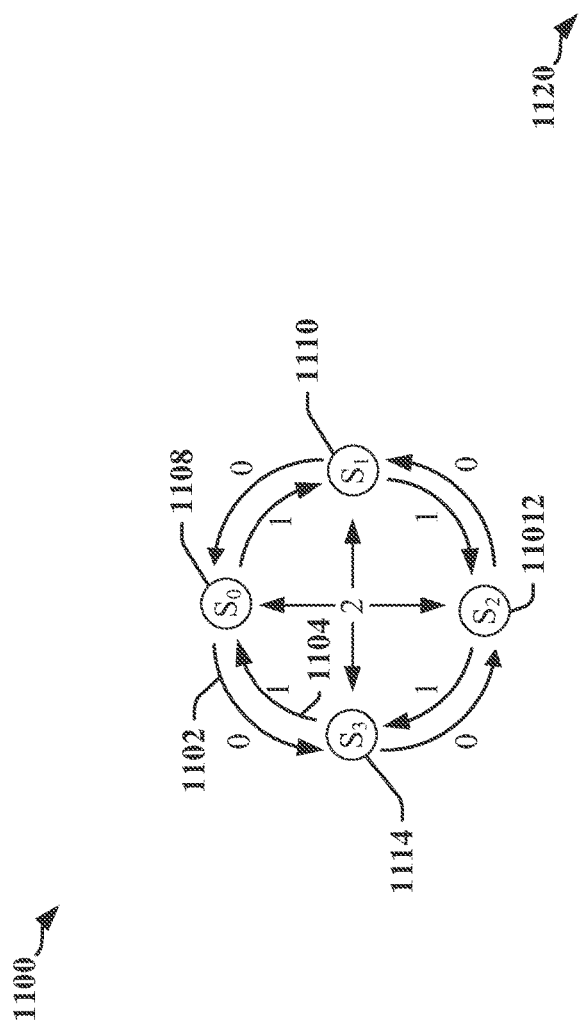
FIG. 11 illustrates a second example of an encoding scheme for transmitting data on a shared bus in accordance with certain aspects disclosed herein.

With reference to FIG. 11, and as discussed in relation to FIGS. 3 and 4, the ternary numbers generated by a transcoder 302 of a transmitter 300 may be represented as a displacement value on and across a circle 402. In one example, a clockwise displacement may be represented as a ternary value T=1, a counter-clockwise displacement may be represented as a ternary value T=0, and a displacement across the circle 402 (i.e., 2 steps clockwise or counterclockwise) be represented as a ternary value T=2.

As an immediate consequence, a line error that produces a symbol identical to either of the adjacent symbols on the circle 402 is not considered a new symbol, and the error may be identified at word level. However, a single symbol error that results in two adjacent Ternary numbers being modified.

According to certain aspects disclosed herein, error correction may be provided for SGbus communications. In order to transfer data, the binary string of information may be transformed into an equal numerical value, coded as a base 3 (ternary) number. As such, fewer characters need to be transmitted between the nodes for the same information. The transformed ternary numbers are a polynomial sum, where the factors are the power of 3 and the coefficients are [0, 1, 2].

$$\sum_{i=0}^{mbinary} B_i 2^i = \sum_{k=0}^{mternary} T_k 3^k$$

where: $T_k$=ternary coefficients, $\in[0, 1, 2]$.

One symbol error may produce an alteration of two adjacent $T_k$ values, and the final sum may be altered by the formula:

$$\pm a \times 3^n \pm b \times 3^{(n-1)} \quad (1)$$

where:

"n"=the rank of erroneous symbol, and

"a" and "b" are coefficients of difference.

The "a" and "b" coefficients respect the following:

$$a \in [0, \pm 1, \pm 2]$$

$$b \in [0, \pm 1, \pm 2]$$

Formula (1) can be written as:

$$(\pm 3a \pm b) \times 3^{(n-1)} \quad (2)$$

In order for the last bits of the LSBs to be left unchanged by the error, formula (2) must be a multiple of the power of 2. The first rank of power of 2 that is not an integer multiple denotes how many LSB end bits must be known in advance so that one symbol error shall be identified. The factor $3^{(n-1)}$ is a multiple of 3 and it will change the LSB bits, if unaltered.

An analysis of the relevant factor ($\pm 3a \pm b$) may be based on the observation that the symbol-to-ternary coding diagram has a circular symmetry. Therefore, a discussion of one point covers all four points. For example, if "2" is the correct symbol, then for any other correct symbol situation, it suffices to replace the respective positions with their rotated values. Table 1 below shows the possible resultant "a" coefficients, and Table 2 shows the possible resultant "b" coefficients.

TABLE 1

| Correct Symbol | Past Symbol | Correct Ternary | ERROR Symbol | ERROR Ternary | ERROR coefficient "a" |
|---|---|---|---|---|---|
| 2 | 1 | 1 | 3 | 2 | 1 |
|   |   |   | 0 | 0 | −1 |
|   |   | 0 | 2 | 3 | 0 | −2 |
|   |   |   | 1 | 1 | −1 |
|   | 3 | 0 | 1 | 2 | 2 |
|   |   |   | 0 | 1 | 1 |

TABLE 2

| Correct Symbol | New Symbol | Correct Ternary | ERROR Symbol | ERROR Ternary | ERROR coefficient "b" |
|---|---|---|---|---|---|
| 2 | 1 | 0 | 3 | 2 | 2 |
|   |   |   | 0 | 1 | 1 |
|   |   | 0 | 2 | 3 | 1 | −1 |
|   |   |   | 1 | 0 | −2 |
|   | 3 | 1 | 1 | 2 | 1 |
|   |   |   | 0 | 0 | −1 |

Table 3 below shows the possible resultant combinations of "a" and "b" coefficients.

TABLE 3

| Correct Symbol | ERROR Symbol | a | a | b | b |
|---|---|---|---|---|---|
| 2 | 3 | 1 | −2 | 2 | −1 |
|   | 1 | −1 | 2 | −2 | 1 |
|   | 0 | −1 | 1 | 1 | −1 |

The possible (a;b) pairs are shown on the same background row, as related to the same possible "ERROR Symbol." A direct inspection reveals that there are combinations that will make, respectively:

($\pm 3a \pm b$)=2, e.g. (1;−1) and (−1;1), ($\pm 3a \pm b$)=4, e.g. (−2;2) and (2;−2).

There are no pairs that would yield ($\pm 3a \pm b$)=8; that would have been possible only for (2;2) or (−2;−2).

Therefore, any known three bits at the LSB end can detect any one single symbol error. For example, "000" may be used, although any other three known bits may play the same role. Any error in the SDA 218, or the SCL 216 may be detected by the last three bits.

According to certain aspects disclosed herein, a supplementary error check can be based on the mandatory translation from symbol binary "01" to binary "00", or the mandatory translation from symbol binary "11" to binary "10", as necessary to avoid the false identification of a STOP condition 908 or repeated START condition 928 while data transfer is in progress. At the completion of the entire data transfer of a plurality of 12-symbol or 20-symbol frames, 4 symbols may be inserted, of which the last two may be binary "01" followed by binary "11", in order to produce a STOP condition 820, 908.

Figure 12:
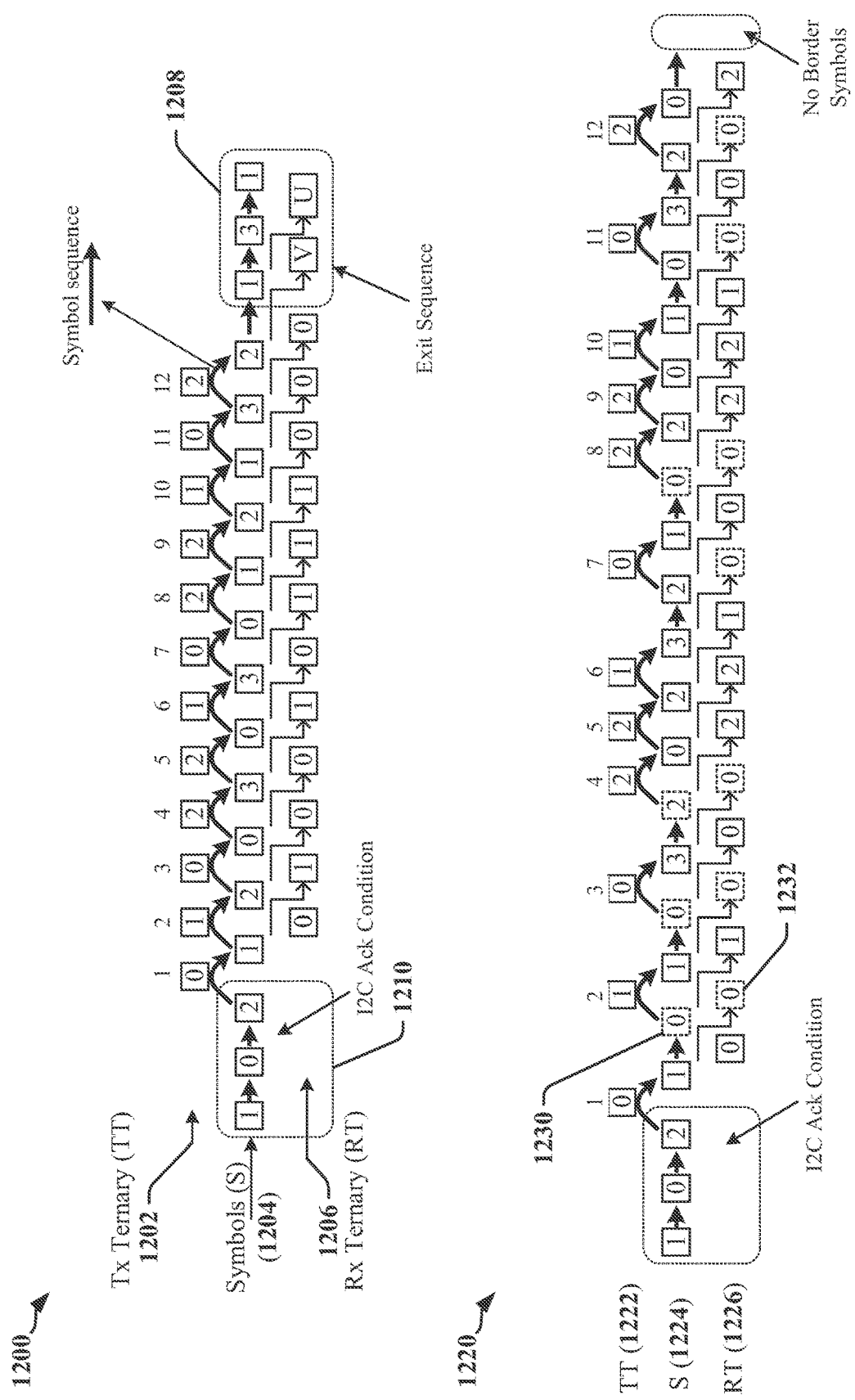
FIG. 12 illustrates examples of SGbus encoding in accordance with certain aspects disclosed herein.
Figure 13:
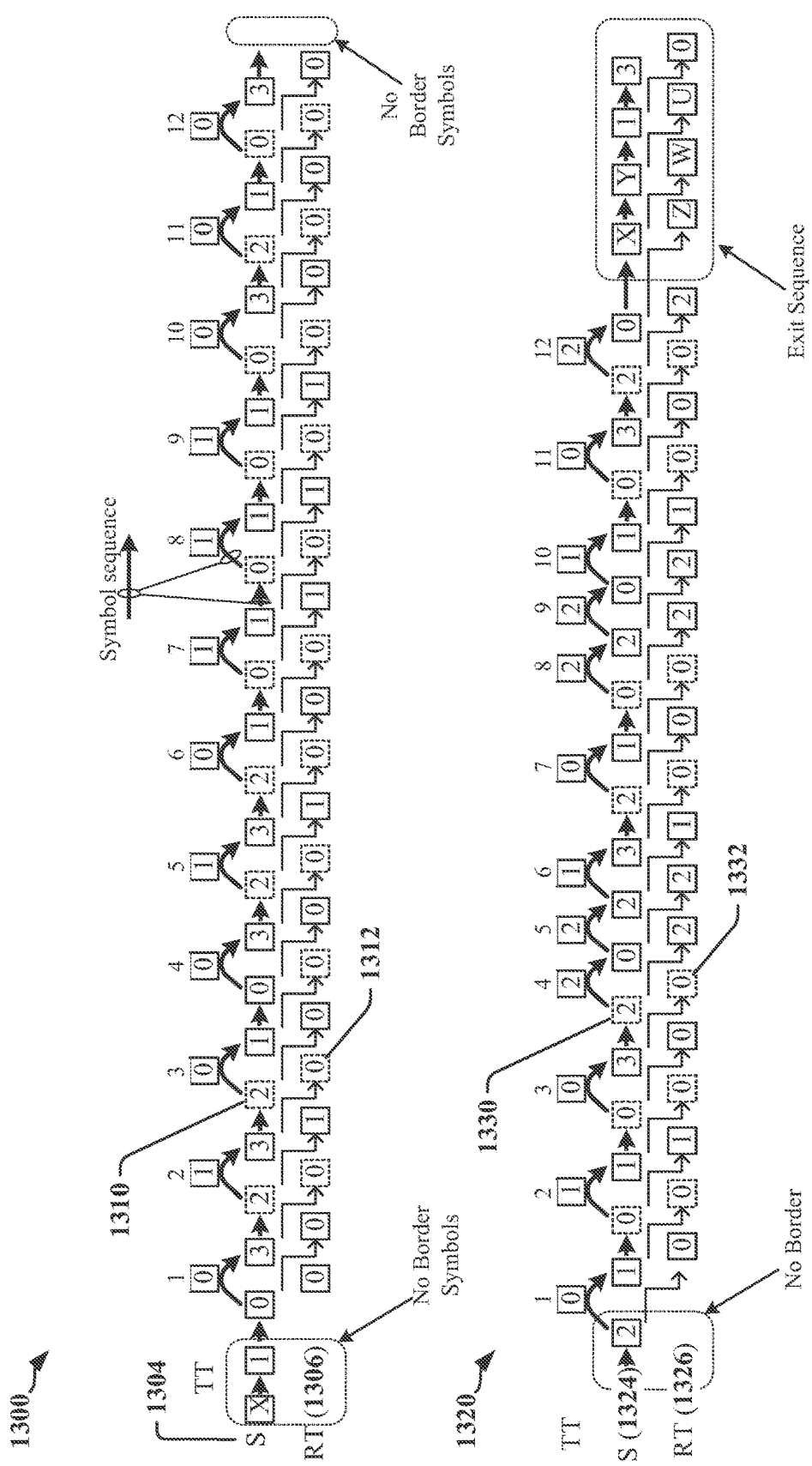
FIG. 13 illustrates further examples of SGbus encoding in accordance with certain aspects disclosed herein.

With reference to FIGS. 12 and 13, certain differences between prior implementations of CCIe and the presently described SGbus may be highlighted. For example, the two coding styles may produce different symbols, although the decoded ternary coefficients are the same in both cases. In another example, the SGbus avoids the unintended (and unwanted) STOP conditions 908 and repeated START conditions 928 (i.e. the binary "01" to binary "11" transition, or the binary "11" to binary "10" translation) on the shared bus 602. For some data streams then, SGbus adds symbols to the transmission, thereby decreasing the data throughput. The CCIe interface has a boundary sequence transmitted for every 12 symbols frame, while the SGbus has only one exit sequence, at the end of the entire data transfer, rather than frame by frame.

In a first example, the timing diagram 1200 of FIG. 12 illustrates a sequence of ternary transmitter (Tx) transition numbers 1202 provided by a transcoder 302 of a transmitter 300 to a ternary-to-symbols converter 304 (see FIG. 3). The converter produces a stream of symbols 1204 for transmission over the serial bus 230 to a receiver 320. A symbols-to-ternary converter 324 of the receiver 320 produces ternary receiver (Rx) transition numbers 1206. There is a direct relationship between the number of Tx transition numbers 1202, the symbols 1204 and the Rx transition numbers 1206.

In a second example, the timing diagram 1220 of FIG. 12 illustrates transmission of a first SGbus data frame, whereby a sequence of transmitter (Tx) ternary numbers 1222 provided by the transcoder 302 to the ternary-to-symbols converter 304 (see FIG. 3). Here, the ternary-to-symbols converter 304 produces a stream of symbols 1224 that includes inserted additional symbols 1230. A symbols-to-ternary converter 324 of the receiver 320 produces ternary receiver (Rx) transition numbers 1226. The symbols-to-ternary converter 324 produces Rx transition numbers 1226 that include additional numbers 1232 that are extracted by the transcoder 322.

FIG. 13 includes third and fourth examples in the timing diagrams 1300 and 1320, whereby the third timing diagram 1300 relates to a middle and/or worst case SGbus frame, and the fourth timing diagram 1320 relates to a last SGbus data frame. In these timing diagrams 1300, 1320, the ternary-to-symbols converter 304 produces a stream of symbols 1304, 1324 that includes inserted additional symbols 1310 and 1330. A symbols-to-ternary converter 324 of the receiver 320 produces ternary Rx transition numbers 1306, 1326. The symbols-to-ternary converter 324 produces Rx transition numbers 1306, 1326 that include additional ternary numbers 1312 and 1332 that are extracted by the transcoder 322.

Different data transfer modes may be available for use on a shared serial bus, with a mode selected for use based on the nature of the bus clients. In one example, a modified CCIe data transfer mode using 12-symbol frames is available when no I2C devices are present or participating on the bus, and there is no need for dummy translation in this mode. In another example, I2C devices are present on the shared bus 602, and a modified CCIe data transfer mode is employed with a 12-symbol frame and dummy translation. The characteristics of this data transfer mode may depend on the capabilities of the I2C clients.

In another example, all types of I2C devices may be assumed to be coupled to the shared bus 602, and a 20-symbol modified CCIe data transfer mode may be used, with a repeated START condition 928 inserted before each 20-symbol frame. In this mode, no dummy translation is inserted, and no legacy I2C masters can be connected to the shared bus 602. In yet another example, only legacy I2C devices are on the shared bus 602 and primary master device controls the bus in I2C mode, with all data transfers using I2C modes, as per the capability of the bus.

As disclosed herein, the SGbus can be a high-speed serial interface bus that may provide multi-drop and multi-master capabilities, using two wires. A conventional clock signal is not required and symbols transmitted using both wires are encoded with data. Clock information is embedded in a stream of symbols by ensuring a transition in signaling state of at least one of the two signal wires between each pair of consecutive symbols. An SGbus protocol may use command codes. An in-band interrupt capability is provided, and asynchronous hot-plug with low latency is supported. SGbus devices can co-exists on the same bus as I2C devices, obeying the same restrictions that apply to legacy I2C devices that might be connected to the same physical bus.

In one aspect, the SGbus communicates using a container architecture, whereby data transfer is encapsulated between bus management elements. Data may be transferred using one of a plurality of protocols, as required or preferred by client devices connected to the bus. In one example, data may be transferred using CCIe protocols and, in another example, data may be transferred according to I2C compliant protocols. Data payload is typically carried using CCIe protocols, although legacy I2C slaves may be addressed and payloads transported in corresponding I2C mode protocols.

Bus management functions associated with the SGbus protocol includes bus arbitration, in-band interrupt, hot-plug, multi-master, entry and exit into data transfer modes.

An SGbus master device may have a dynamic address assignment capability. The SGbus master may include a clock generator used for in-band interrupts, a register-based memory for retaining the addresses and characteristics of devices connected to the bus. The SGbus master device may communicate using either I2C or CCIe data transfer protocols.

An SGbus slave may be dynamically addressable, and may be able to request and receive its address for the bus on which it is connected. The SGbus slave device supports at least CCIe protocols and, in some examples, an SGbus slave device may be capable of communicating using legacy I2C protocols.

The SGbus supports fast data transfer protocol, including a data transfer protocol that adopts a CCIe style coding, which can provide an optimized (least amount of energy per byte) during transmission. An in-band IRQ procedure may be supported and minimal latency restrictions (typically 10 μs) may be imposed. Increased efficiency may be obtained because there is no need for a heartbeat-type signal. Asynchronous, hot-plug capability may be provided.

In some instances, increased system design flexibility is achieved by configuration at local system design level. Dynamic addressing reduces or eliminates dependency on global addressing entities. Dynamic addressing employs random address generators, thereby easing manufacturing overhead.

Certain implementations of the SGbus can fully co-exist with all legacy I2C devices. However, the presence of certain low-speed and ultra-low-cost legacy I2C devices may prevent the use of legacy I2C masters. Legacy I2C devices need not evaluate their address match on the line for every CCIe coded frame.

In some instances, enhanced capability and speed increases may be obtained by the addition of one or more supplementary lines, enabling a change in the coding base to higher numbers. For example, a single additional link line, 0-7 symbols may be transferred, with relative jumps are from 0 to 6, thus allowing for coding in base 7.

Examples of Certain Aspects of Processing Circuits and their Configuration

Figure 14:
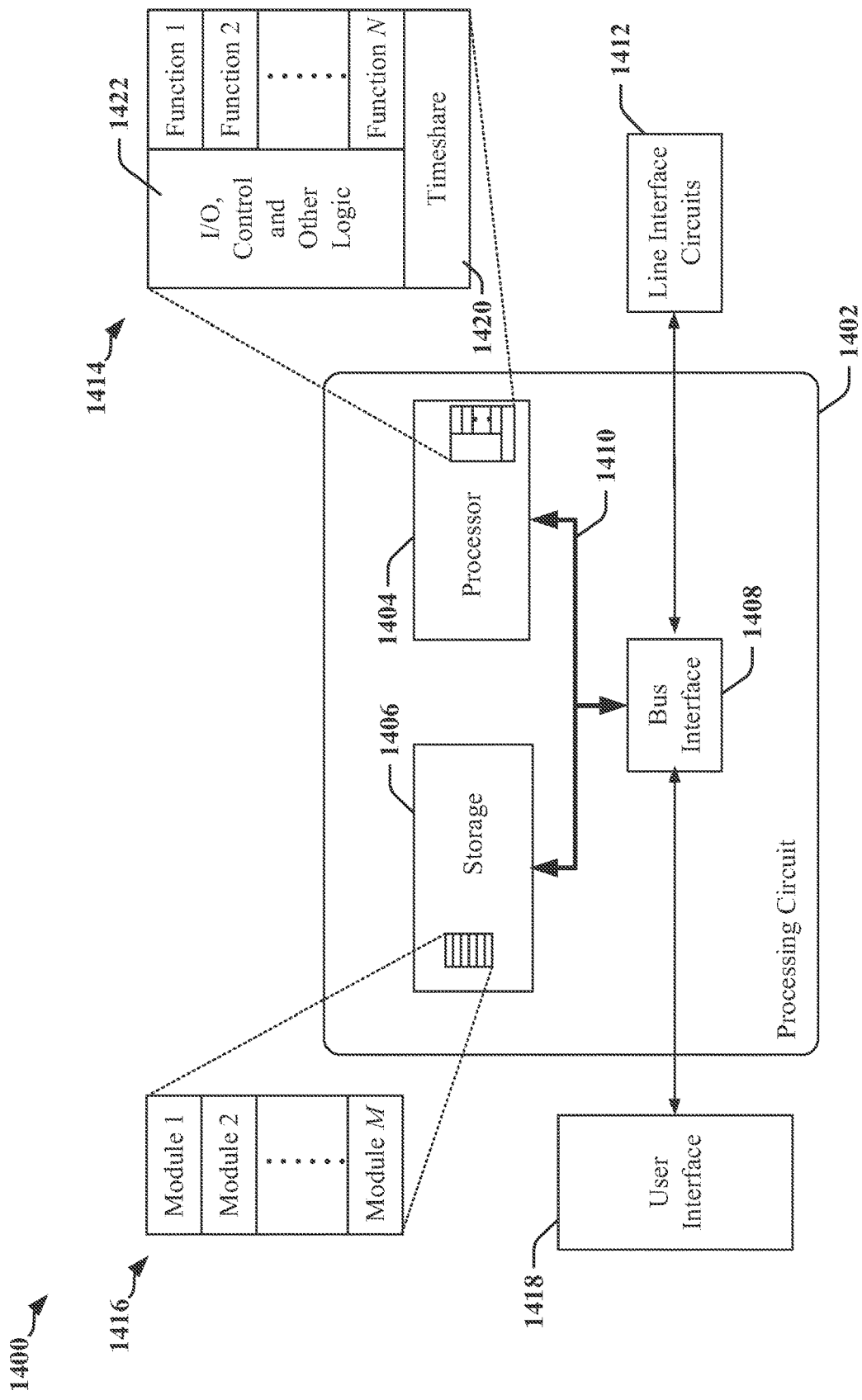
FIG. 14 is a block diagram illustrating an example of an apparatus employing a processing circuit that may be adapted according to certain aspects disclosed herein.

FIG. 14 is a conceptual diagram 1400 illustrating a simplified example of a hardware implementation for an apparatus employing a processing circuit 1402 that may be configured to perform one or more functions disclosed herein. In accordance with various aspects of the disclosure, an element, or any portion of an element, or any combination of elements as disclosed herein may be implemented using the processing circuit 1402. The processing circuit 1402 may include one or more processors 1404 that are controlled by some combination of hardware and software modules. Examples of processors 1404 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1404 may include specialized processors that perform specific functions, and that may be configured, augmented or controlled by one of the software modules 1416. The one or more processors 1404 may be configured through a combination of software modules 1416 loaded during initialization, and further configured by loading or unloading one or more software modules 1416 during operation.

In the illustrated example, the processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including the one or more processors 1404, and storage 1406. Storage 1406 may include memory devices and mass storage devices, and may be referred to herein as computer-readable media and/or processor-readable media. The bus 1410 may also link various other circuits such as timing sources, timers, peripherals, voltage regulators, and power management circuits. A bus interface 1408 may provide an interface between the bus 1410 and one or more transceivers 1412. A transceiver 1412 may be provided for each networking technology supported by the processing circuit. In some instances, multiple networking technologies may share some or all of the circuitry or processing modules found in a transceiver 1412. Each transceiver 1412 provides a means for communicating with various other apparatus over a transmission medium. Depending upon the nature of the apparatus, a user interface 1418 (e.g., keypad, display, speaker, microphone, joystick) may also be provided, and may be communicatively coupled to the bus 1410 directly or through the bus interface 1408.

A processor 1404 may be responsible for managing the bus 1410 and for general processing that may include the execution of software stored in a computer-readable medium that may include the storage 1406. In this respect, the processing circuit 1402, including the processor 1404, may be used to implement any of the methods, functions and techniques disclosed herein. The storage 1406 may be used for storing data that is manipulated by the processor 1404 when executing software, and the software may be configured to implement any one of the methods disclosed herein.

One or more processors 1404 in the processing circuit 1402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1406 or in an external computer readable medium. The external computer-readable medium and/or storage 1406 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1406 may also include, by way of example, a carrier wave, a transmission line, and any other suitable medium for transmitting software and/or instructions that may be accessed and read by a computer. Computer-readable medium and/or the storage 1406 may reside in the processing circuit 1402, in the processor 1404, external to the processing circuit 1402, or be distributed across multiple entities including the processing circuit 1402. The computer-readable medium and/or storage 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1406 may maintain software maintained and/or organized in loadable code segments, modules, applications, programs, etc., which may be referred to herein as software modules 1416. Each of the software modules 1416 may include instructions and data that, when installed or loaded on the processing circuit 1402 and executed by the one or more processors 1404, contribute to a run-time image 1414 that controls the operation of the one or more processors 1404. When executed, certain instructions may cause the processing circuit 1402 to perform functions in accordance with certain methods, algorithms and processes described herein.

Some of the software modules 1416 may be loaded during initialization of the processing circuit 1402, and these software modules 1416 may configure the processing circuit 1402 to enable performance of the various functions disclosed herein. For example, some software modules 1416 may configure internal devices and/or logic circuits 1422 of the processor 1404, and may manage access to external devices such as the transceiver 1412, the bus interface 1408, the user interface 1418, timers, mathematical coprocessors, and so on. The software modules 1416 may include a control program and/or an operating system that interacts with interrupt handlers and device drivers, and that controls access to various resources provided by the processing circuit 1402. The resources may include memory, processing time, access to the transceiver 1412, the user interface 1418, and so on.

One or more processors 1404 of the processing circuit 1402 may be multifunctional, whereby some of the software modules 1416 are loaded and configured to perform different functions or different instances of the same function. The one or more processors 1404 may additionally be adapted to manage background tasks initiated in response to inputs from the user interface 1418, the transceiver 1412, and device drivers, for example. To support the performance of multiple functions, the one or more processors 1404 may be configured to provide a multitasking environment, whereby each of a plurality of functions is implemented as a set of tasks serviced by the one or more processors 1404 as needed or desired. In one example, the multitasking environment may be implemented using a timesharing program 1420 that passes control of a processor 1404 between different tasks, whereby each task returns control of the one or more processors 1404 to the timesharing program 1420 upon completion of any outstanding operations and/or in response to an input such as an interrupt. When a task has control of the one or more processors 1404, the processing circuit is effectively specialized for the purposes addressed by the function associated with the controlling task. The timesharing program 1420 may include an operating system, a main loop that transfers control on a round-robin basis, a function that allocates control of the one or more processors 1404 in accordance with a prioritization of the functions, and/or an interrupt driven main loop that responds to external events by providing control of the one or more processors 1404 to a handling function.

Figure 15:
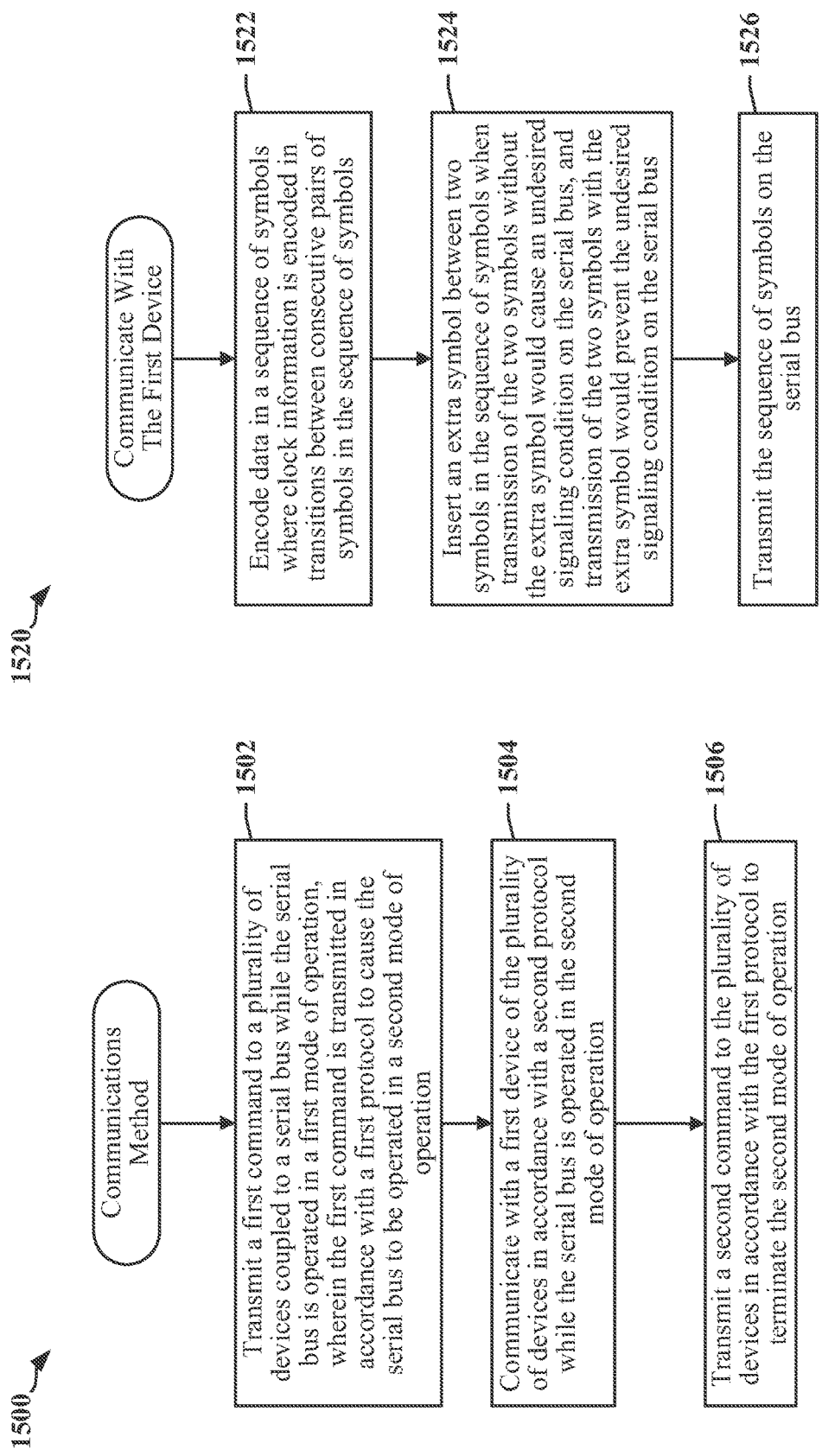
FIG. 15 is a flow chart of a first example of a method for communicating using an SGbus in accordance with one or more aspects disclosed herein.

FIG. 15 includes flowcharts 1500, 1520 that illustrate certain aspects of a method for data communications on an SGbus serial interface. Various steps of the method may be performed by a device that includes some combination of a bus master device 220, a bus slave device 202 illustrated in FIG. 2, the devices 300 or 320 illustrated in FIG. 3, and/or other devices described herein.

At block 1502, the master device may transmit a first command to a plurality of devices coupled to a serial bus while the serial bus is operated in a first mode of operation. The first command may be transmitted in accordance with a first protocol to cause the serial bus to be operated in a second mode of operation.

At block 1504, the master device may communicate (see flowchart 1520) with a first device of the plurality of devices in accordance with a second protocol while the serial bus is operated in the second mode of operation.

At block 1506, the master device may transmit a second command to the plurality of devices in accordance with the first protocol to terminate the second mode of operation.

In some instances, communicating with the first device includes determining that transmitting the two symbols will cause a pulse that has a duration greater than 50 nanoseconds to occur on a first wire of the serial bus if the two symbols are transmitted over the serial bus, and inserting an extra symbol into the sequence of symbols, the extra symbol being selected to terminate the pulse on the first wire.

The second device may ignore communications on the serial bus while the serial bus is operated in the second mode of operation when the extra symbol is inserted between the two symbols.

In one example, each symbol of the sequence of symbols has a plurality of bits, each bit defining a signaling state of one wire of the serial bus for one symbol interval. Each pair of consecutive symbols in the sequence of symbols includes two different symbols. The signaling state of at least one wire of the serial bus may change when the second symbol in the each pair of consecutive symbols is transmitted.

In another example, a third command may be transmitted to the plurality of devices while the serial bus is operated in the first mode of operation. The third command may be transmitted in accordance with the first protocol to cause the serial bus to be operated in a third mode of operation. The master device may communicate with a third device of the plurality of devices in accordance with a third protocol while the serial bus is operated in the third mode of operation. The master device may transmit a fourth command to the plurality of devices in accordance with the first protocol to terminate the second mode of operation.

The second flowchart 1520 relates to communicating with the first device. At block 1522, the master device may encode data in a sequence of symbols where clock information is encoded in transitions between consecutive pairs of symbols in the sequence of symbols.

At block 1524, the master device may insert an extra symbol between two symbols in the sequence of symbols when transmission of the two symbols without the extra symbol would cause an undesired signaling condition on the serial bus, and transmission of the two symbols with the extra symbol would prevent the undesired signaling condition on the serial bus.

At block 1526, the master device may transmit the sequence of symbols on the serial bus.

In one example, the undesired signaling condition relates to relative timing of transitions on two wires of the serial bus.

In another example, the undesired signaling condition relates to duration of a pulse transmitted on one wire of the serial bus.

In another example, the undesired signaling condition relates to a synchronization or START condition defined by a protocol other than the second protocol.

The first protocol may comply with or be compatible with an I2C protocol, where the undesired signaling condition relates to a START condition defined by the I2C protocol.

Figure 16:
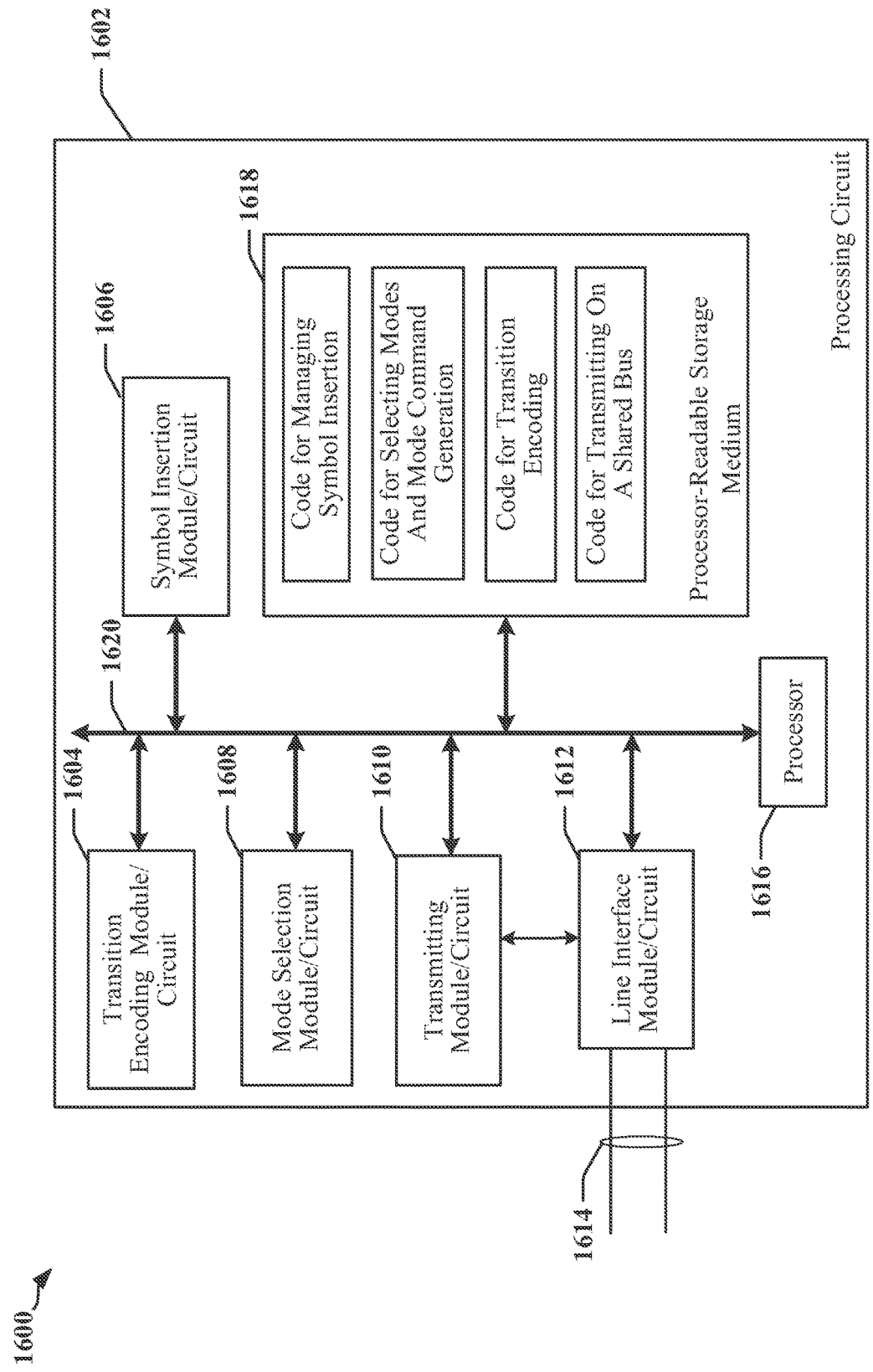
FIG. 16 is a diagram illustrating a first example of a hardware implementation for an apparatus employing a processing circuit adapted according to certain aspects disclosed herein.

FIG. 16 is a diagram illustrating a simplified example of a hardware implementation for an apparatus 1600 employing a processing circuit 1602. The processing circuit typically has a processor 1616 that may include one or more of a microprocessor, microcontroller, digital signal processor, a sequencer and a state machine. The processing circuit 1602 may be implemented with a bus architecture, represented generally by the bus 1620. The bus 1620 may include any number of interconnecting buses and bridges depending on the specific application of the processing circuit 1602 and the overall design constraints. The bus 1620 links together various circuits including one or more processors and/or hardware modules, represented by the processor 1616, various modules or circuits 1604, 1606, 1608, 1610, line interface circuits 1612 configurable to communicate over connectors or wires 1614 and the computer-readable storage medium 1618. The bus 1620 may also link various other circuits such as timing sources, peripherals, voltage regulators, and power management circuits, which are well known in the art, and therefore, will not be described any further.

The processor 1616 is responsible for general processing, including the execution of software stored on the computer-readable storage medium 1618. The software, when executed by the processor 1616, causes the processing circuit 1602 to perform the various functions described supra for any particular apparatus. The computer-readable storage medium 1618 may also be used for storing data that is manipulated by the processor 1616 when executing software, including data decoded from symbols transmitted over the connectors or wires 1614. The processing circuit 1602 further includes at least one of the modules 1604, 1606, 1608, 1610. The modules 1604, 1606, 1608, 1610 may be software modules running in the processor 1616, resident/stored in the computer readable storage medium 1618, one or more hardware modules coupled to the processor 1616, or some combination thereof. The modules 1604, 1606, 1608, and/or 1610 may include microcontroller instructions, state machine configuration parameters, or some combination thereof.

In one configuration, the apparatus 1600 for wireless communication includes modules and/or circuits 1608, 1610 that are configured to transmit a first command to a plurality of devices coupled to a serial bus (e.g., the connectors or wires 1614) while the serial bus is operated in a first mode of operation, where the first command is transmitted in accordance with a first protocol to cause the serial bus to be operated in a second mode of operation. The apparatus 1600 may also include modules and/or circuits 1604 that are configured to encode data in a sequence of symbols in accordance with a second protocol, where clock information is encoded in transitions between consecutive pairs of symbols in the sequence of symbols. The apparatus 1600 may also include modules and/or circuits 1606 that are configured to insert an extra symbol between two symbols in the sequence of symbols when transmission of the two symbols without the extra symbol would cause an undesired signaling condition on the serial bus, and transmission of the two symbols with the extra symbol would prevent the undesired signaling condition on the serial bus. The apparatus 1600 may also include modules and/or circuits 1608, 1610, 1612 that are configured to transmit the sequence of symbols on the serial bus in accordance with the second protocol. The apparatus 1600 may also include modules and/or circuits 1608, 1610 that are configured for transmitting a second command to the plurality of devices in accordance with the first protocol to terminate the second mode of operation.

Figure 17:
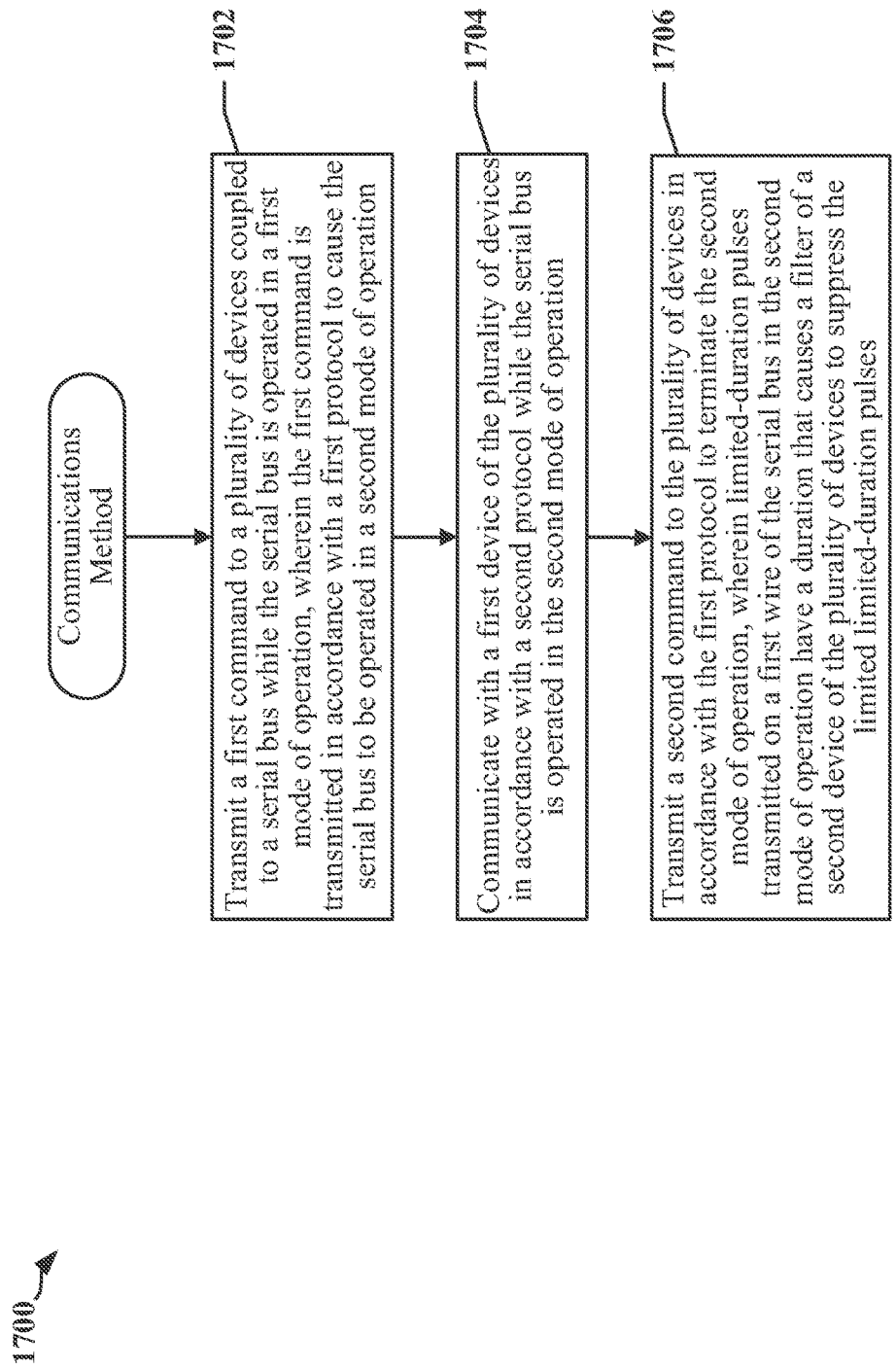
FIG. 17 is a flow chart of a second example of a method for communicating using an SGbus in accordance with one or more aspects disclosed herein.

FIG. 17 is a flowchart 1700 illustrating a method for data communications on an SGbus serial interface. Various steps of the method may be performed by a device that includes some combination of a bus master device 220, a bus slave device 202 illustrated in FIG. 2, the devices 300 or 320 illustrated in FIG. 3, and/or other devices described herein.

At block 1702, the master device may transmit a first command to a plurality of devices coupled to a serial bus while the serial bus is operated in a first mode of operation. The first command may be transmitted in accordance with a first protocol. The first command may cause the serial bus to be operated in a second mode of operation.

At block 1704, the master device may communicate with a first device of the plurality of devices in accordance with a second protocol while the serial bus is operated in the second mode of operation.

At block 1706, the master device may transmit a second command to the plurality of devices in accordance with the first protocol to terminate the second mode of operation.

Limited-duration pulses transmitted on a first wire of the serial bus in the second mode of operation may have a duration that causes a filter of a second device of the plurality of devices to suppress the limited-duration pulses. The second device may ignore communications on the serial bus while the serial bus is operated in the second mode of operation when the limited-duration pulses are suppressed.

In one example, the first mode of operation is an I2C mode of communication. The limited-duration pulses may have a duration no greater than 50 nanoseconds. The limited-duration pulses may be transmitted on an SCL wire of the serial bus.

In another example, communicating in accordance with the second protocol includes encoding data in a sequence of multi-bit symbols, each bit of each multi-bit symbol defining a signaling state of one wire of the serial bus for one symbol interval. The master device may determine that transmitting two or more consecutive symbols in the sequence of symbols will cause a pulse that has a duration greater than 50 nanoseconds to occur on the first wire if the two or more consecutive symbols are transmitted over the serial bus. Accordingly, the master device may insert an extra symbol into the sequence of symbols, the extra symbol being selected to prevent occurrence of the pulse that has the duration greater than 50 nanoseconds. One bit of each multi-bit symbol may define whether a limited-duration pulse is transmitted on the first wire in a corresponding symbol interval.

In another example, the second mode of operation is a CCIe mode of communication.

In another example, the first device includes a sensor and the second mode of operation supports a protocol adapted for coupling a plurality of different sensors.

In another example, the master device may transmit a third command to the plurality of devices while the serial bus is operated in the first mode of operation. The third command may be transmitted in accordance with the first protocol to cause the serial bus to be operated in a third mode of operation. The master device may then communicate in accordance with a third protocol with a third device of the plurality of devices while the serial bus is operated in the third mode of operation. The master device may subsequently transmit a fourth command to the plurality of devices in accordance with the first protocol to terminate the second mode of operation. Limited-duration pulses transmitted on the first wire in the second mode of operation have a duration that causes a filter of the second device of the plurality of devices to suppress the limited-duration pulses.

In another example, the first master device may communicate with the first device by encoding data in a sequence of symbols where clock information is encoded in transitions between consecutive pairs of symbols in the sequence of symbols, inserting an extra symbol between two symbols in the sequence of symbols when transmission of the two symbols without the extra symbol would cause an undesired signaling condition on the serial bus, and transmission of the two symbols with the extra symbol would prevent the undesired signaling condition on the serial bus, and transmitting the sequence of symbols on the serial bus.

Figure 18:
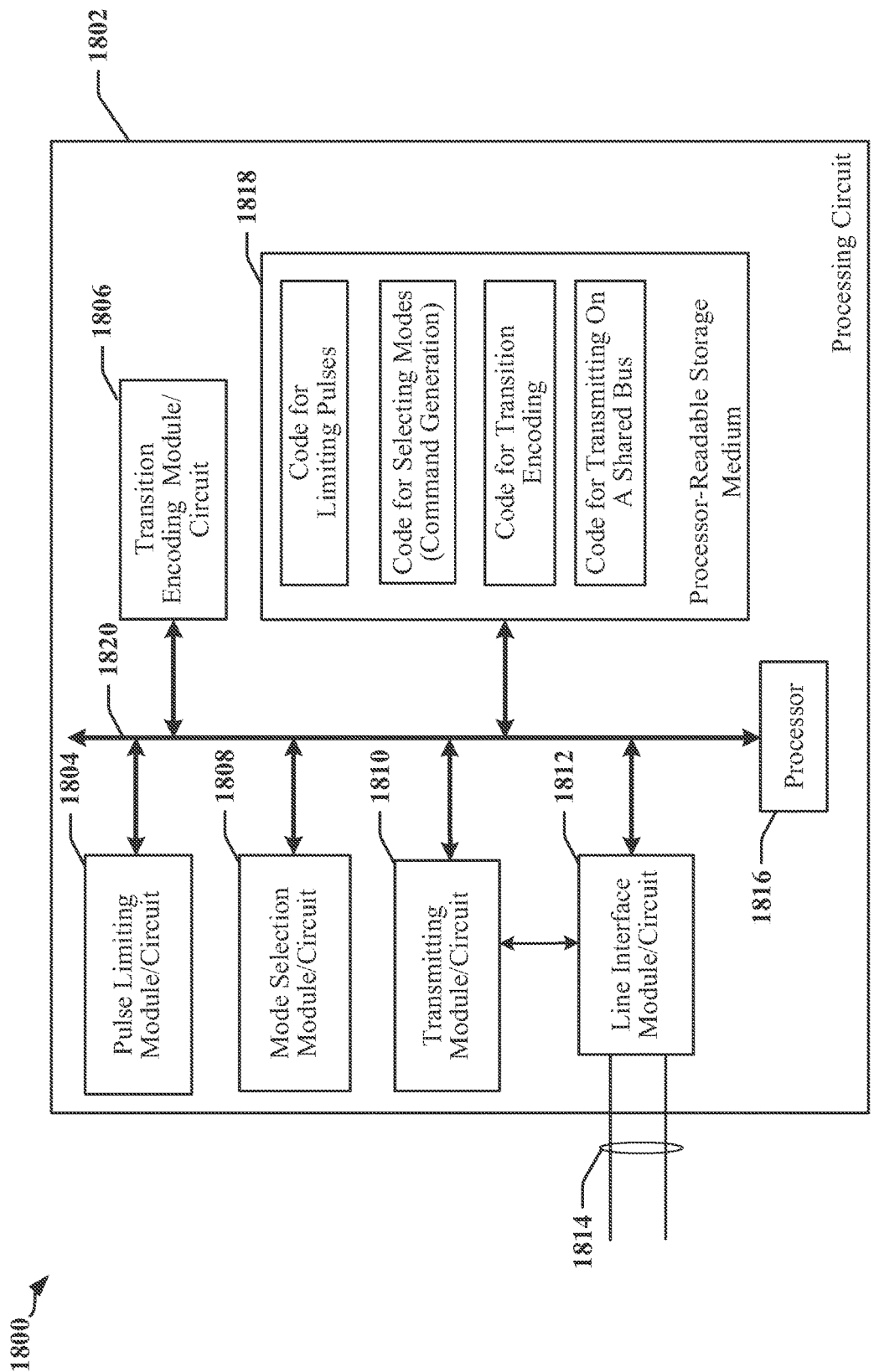
FIG. 18 is a diagram illustrating a second example of a hardware implementation for an apparatus employing a processing circuit adapted according to certain aspects disclosed herein.

FIG. 18 is a diagram illustrating a simplified example of a hardware implementation for an apparatus 1800 employing a processing circuit 1802. The processing circuit typically has a processor 1816 that may include one or more of a microprocessor, microcontroller, digital signal processor, a sequencer and a state machine. The processing circuit 1802 may be implemented with a bus architecture, represented generally by the bus 1820. The bus 1820 may include any number of interconnecting buses and bridges depending on the specific application of the processing circuit 1802 and the overall design constraints. The bus 1820 links together various circuits including one or more processors and/or hardware modules, represented by the processor 1816, various modules or circuits 1804, 1806, 1808, 1810, line interface circuits 1812 configurable to communicate over connectors or wires 1814 and the computer-readable storage medium 1818. The bus 1820 may also link various other circuits such as timing sources, peripherals, voltage regulators, and power management circuits, which are well known in the art, and therefore, will not be described any further.

The processor 1816 is responsible for general processing, including the execution of software stored on the computer-readable storage medium 1818. The software, when executed by the processor 1816, causes the processing circuit 1802 to perform the various functions described supra for any particular apparatus. The computer-readable storage medium 1818 may also be used for storing data that is manipulated by the processor 1816 when executing software, including data decoded from symbols transmitted over the connectors 1814. The processing circuit 1802 further includes at least one of the modules 1804, 1806, 1808, 1810.

The modules 1804, 1806, 1808, 1810 may be software modules running in the processor 1816, resident/stored in the computer readable storage medium 1818, one or more hardware modules coupled to the processor 1816, or some combination thereof. The modules 1804, 1806, 1808, and/or 1810 may include microcontroller instructions, state machine configuration parameters, or some combination thereof.

In one configuration, the apparatus 1800 for wireless communication includes modules and/or circuits 1808, 1810 that are configured to transmit a first command to a plurality of devices coupled to a serial bus (e.g., the connectors or wires 1814) while the serial bus is operated in a first mode of operation, where the first command is transmitted in accordance with a first protocol to cause the serial bus to be operated in a second mode of operation. The apparatus 1800 may also include modules and/or circuits 1806, 1810 that are configured for communicating in accordance with a second protocol with a first device of the plurality of devices while the serial bus is operated in the second mode of operation, and modules and/or circuits 1808, 1810 that are configured for transmitting a second command to the plurality of devices in accordance with the first protocol to terminate the second mode of operation, and modules and/or circuits 1804, 1810 that are configured to provide limited-duration pulses for transmission on a first wire of the serial bus in the second mode of operation have a duration that causes a filter of a second device of the plurality of devices to suppress the limited-duration pulses.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed in a data communication interface, comprising:

transmitting a first command to a plurality of devices coupled to a serial bus while the serial bus is operated in a first mode of operation, wherein the first command is transmitted in accordance with a first protocol to cause the serial bus to be operated in a second mode of operation;

communicating with a first device of the plurality of devices in accordance with a second protocol after the first command has been transmitted, wherein communicating with the first device after the first command has been transmitted includes:

causing the serial bus to be operated in the second mode of operation;

encoding data in a sequence of symbols where clock information is encoded in transitions between consecutive pairs of symbols in the sequence of symbols;

inserting an extra symbol between two symbols in the sequence of symbols when transmission of the two symbols without the extra symbol would cause an undesired signaling condition on the serial bus, and transmission of the two symbols with the extra symbol would prevent the undesired signaling condition on the serial bus; and transmitting the sequence of symbols on the serial bus;

communicating with a second device of the plurality of devices in accordance with the first protocol after the first command has been transmitted; and transmitting a second command to the plurality of devices in accordance with the first protocol to cause the first device to exit the second mode of operation, wherein the undesired signaling condition relates to a synchronization or start condition defined by a protocol other than the second protocol, and wherein communication with the first device is conducted in accordance with the second protocol until the second command has been transmitted.

2. The method of claim 1, wherein the undesired signaling condition relates to relative timing of transitions on two wires of the serial bus.

3. The method of claim 1, wherein the undesired signaling condition relates to duration of a pulse transmitted on one wire of the serial bus.

4. The method of claim 1, wherein communicating with the first device comprises:

determining that transmitting the two symbols will cause a pulse that has a duration greater than 50 nanoseconds to occur on a first wire of the serial bus if the two symbols are transmitted on the serial bus; and inserting the extra symbol into the sequence of symbols, the extra symbol being selected to terminate the pulse on the first wire.

5. The method of claim 1, wherein the second device ignores communications on the serial bus while the serial bus is operated in the second mode of operation when the extra symbol is inserted between the two symbols.

6. The method of claim 1, wherein the first protocol is compatible with an Inter-Integrated Circuit (I2C) protocol, and wherein the undesired signaling condition relates to a start condition defined by the I2C protocol.

7. The method of claim 1, wherein each symbol of the sequence of symbols has a plurality of bits, each bit defining a signaling state of one wire of the serial bus for one symbol interval.

8. The method of claim 7, wherein each pair of consecutive symbols in the sequence of symbols comprises two different symbols, and wherein signaling state of at least one wire of the serial bus changes when a second symbol in each pair of consecutive symbols is transmitted.

9. The method of claim 1, further comprising:
transmitting a third command to the plurality of devices while the serial bus is operated in the first mode of operation, wherein the third command is transmitted in accordance with the first protocol to cause the serial bus to be operated in a third mode of operation;
communicating with a third device of the plurality of devices in accordance with a third protocol while the serial bus is operated in the third mode of operation; and
transmitting a fourth command to the plurality of devices in accordance with the first protocol to terminate the third mode of operation.

10. The method of claim 1, wherein communicating with the second device comprises:
causing the serial bus to be operated in the second mode of operation while communicating with the second device.

11. An apparatus for data communication, comprising:
a transceiver that couples the apparatus to a serial bus; and
a processing circuit configured to:
transmit a first command to a first device coupled to the serial bus while the serial bus is operated in a first mode of operation, wherein the first command is transmitted in accordance with a first protocol to cause the serial bus to be operated in a second mode of operation;
encode data in a sequence of symbols in accordance with a second protocol, where clock information is encoded in transitions between consecutive pairs of symbols in the sequence of symbols while the serial bus is operated in the second mode of operation;
insert an extra symbol between two symbols in the sequence of symbols when transmission of the two symbols without the extra symbol would cause an undesired signaling condition on the serial bus, and transmission of the two symbols with the extra symbol would prevent the undesired signaling condition on the serial bus;
transmit the sequence of symbols on the serial bus in accordance with the second protocol;
communicate with a second device in accordance with the first protocol after the first command has been transmitted; and
transmit a second command to the first device in accordance with the first protocol to cause the first device to exit the second mode of operation,
wherein the undesired signaling condition relates to a synchronization or start condition defined by a protocol other than the second protocol, and
wherein communication with the first device is conducted in accordance with the second protocol until the second command has been transmitted.

12. The apparatus of claim 11, wherein the undesired signaling condition relates to duration of a pulse transmitted on one wire of the serial bus.

13. The apparatus of claim 11, wherein each symbol of the sequence of symbols has a plurality of bits, each bit defining a signaling state of one wire of the serial bus for one symbol interval.

14. The apparatus of claim 11, wherein the processing circuit is further configured to:
cause the serial bus to be operated in the second mode of operation while communicating with the second device.

15. A method performed in a data communication interface, comprising:
transmitting a first command to a plurality of devices coupled to a serial bus while the serial bus is operated in a first mode of operation, wherein the first command is transmitted in accordance with a first protocol to cause the serial bus to be operated in a second mode of operation;
communicating with a first device of the plurality of devices in accordance with a second protocol while the serial bus is operated in the second mode of operation, wherein communicating with the first device comprises:
causing the serial bus to be operated in the second mode of operation; and
transmitting limited-duration pulses on a first wire of the serial bus in the second mode of operation with a duration that causes a filter of a second device of the plurality of devices to suppress the limited-duration pulses;
communicating with a third device of the plurality of devices in accordance with the first protocol after the first command has been transmitted; and
transmitting a second command to the plurality of devices in accordance with the first protocol to cause the first device to exit the second mode of operation,
wherein further communications with the first device are conducted in accordance with the second protocol until the second command has been transmitted, and
wherein each of the first command and the second command is transmitted as a corresponding multi-bit command code preceded in transmission by a start condition and an address field.

16. The method of claim 15, wherein the second device ignores communications on the serial bus while the serial bus is operated in the second mode of operation when the limited-duration pulses are suppressed.

17. The method of claim 15, wherein the first mode of operation is an Inter-Integrated Circuit (I2C) mode of communication, and wherein the limited-duration pulses have a duration no greater than 50 nanoseconds and are transmitted on a serial clock (SCL) wire of the serial bus.

18. The method of claim 15, further comprising:
transmitting a third command to the plurality of devices coupled to a serial bus while the serial bus is operated in the first mode of operation, wherein the third command is transmitted in accordance with the first protocol to cause the serial bus to be operated in a third mode of operation; and
communicating with a fourth device of the plurality of devices in accordance with a third protocol while the serial bus is operated in the third mode of operation, wherein communicating with the fourth device in the third mode of operation includes encoding data in a sequence of symbols, each bit of each symbol defining a signaling state of one wire of the serial bus for one symbol interval.

19. The method of claim 18, further comprising:
determining that transmitting two or more consecutive symbols in the sequence of symbols will cause a pulse that has a duration greater than 50 nanoseconds to occur on the first wire if the two or more consecutive symbols are transmitted on the serial bus; and
inserting an extra symbol into the sequence of symbols, the extra symbol being selected to prevent occurrence of the pulse that has the duration greater than 50 nanoseconds.

20. The method of claim 18, wherein one bit of each symbol determines whether a limited-duration pulse is transmitted on the first wire in a corresponding symbol interval.

21. The method of claim 15, wherein the second mode of operation is a camera control interface (CCIe) mode of communication.

22. The method of claim 15, wherein the first device comprises a sensor and the second mode of operation supports a protocol adapted for coupling a plurality of different sensors.

23. The method of claim 15, further comprising:
communicating with a fourth device of the plurality of devices in accordance with the first protocol after the first command has been transmitted and before the second command has been transmitted.

24. An apparatus comprising:
means for transmitting a first command to a plurality of devices coupled to a serial bus while the serial bus is operated in a first mode of operation, wherein the first command is transmitted in accordance with a first protocol to cause the serial bus to be operated in a second mode of operation;
means for communicating in accordance with a second protocol with a first device of the plurality of devices while the serial bus is operated in the second mode of operation, wherein the means for communicating with the first device is configured to:
cause the serial bus to be operated in the second mode of operation; and
transmit limited-duration pulses on a first wire of the serial bus in the second mode of operation with a duration that causes a filter of a second device of the plurality of devices to suppress the limited-duration pulses;
means for communicating with a third device of the plurality of devices in accordance with the first protocol after the first command has been transmitted; and
means for transmitting a second command to the plurality of devices in accordance with the first protocol to terminate the second mode of operation,
wherein communication between the apparatus and the first device is conducted in accordance with the second protocol until the second command has been transmitted, and
wherein each of the first command and the second command is transmitted as a corresponding multi-bit command code preceded in transmission by a start condition and an address field.

25. The apparatus of claim 24, wherein the second device ignores communications on the serial bus while the serial bus is operated in the second mode of operation when the limited-duration pulses are suppressed.

26. The apparatus of claim 24, wherein the first mode of operation is an Inter-Integrated Circuit (I2C) mode of communication, and wherein the limited-duration pulses have a duration no greater than 50 nanoseconds and are transmitted on a serial clock (SCL) wire of the serial bus.

27. The apparatus of claim 24, wherein the means for communicating with the first device is further configured to:
encode data in a sequence of multi-bit symbols, each bit of each multi-bit symbol defining a signaling state of one wire of the serial bus for one symbol interval.

28. The apparatus of claim 24, further comprising:
means for encoding data in a sequence of symbols where clock information is encoded in transitions between consecutive pairs of symbols in the sequence of symbols;
means for determining that transmitting two or more consecutive symbols in the sequence of symbols will cause a pulse that has a duration greater than 50 nanoseconds to occur on the first wire if the two or more consecutive symbols are transmitted over on the serial bus; and
means for inserting an extra symbol into the sequence of symbols, the extra symbol being selected to prevent occurrence of the pulse that has the duration greater than 50 nanoseconds.

29. The apparatus of claim 24, further comprising:
means for communicating with a fourth device of the plurality of devices in accordance with the first protocol after the first command has been transmitted and before the second command has been transmitted.

* * * * *